US011680648B2

(12) United States Patent
Spittelmeister et al.

(10) Patent No.: US 11,680,648 B2
(45) Date of Patent: Jun. 20, 2023

(54) DEVICE FOR REGULATING THE FLOW OF A FLUID

(71) Applicant: Asco Numatics GmbH, Oelbronn-Duerrn (DE)

(72) Inventors: Uwe Spittelmeister, Ettlingen (DE); Peter Metternich De Oliveira, Maulbronn (DE); Felix Ams, Kaempfelbach (DE); Morgan Gustafsson, Haellingsjoe (SE)

(73) Assignee: Asco Numatics GmbH, Oelbronn-Duerrn (DE)

( * ) Notice: Subject to any disclaimer, the term of this patent is extended or adjusted under 35 U.S.C. 154(b) by 77 days.

(21) Appl. No.: 17/465,346

(22) Filed: Sep. 2, 2021

(65) Prior Publication Data

US 2021/0396321 A1    Dec. 23, 2021

Related U.S. Application Data

(63) Continuation of application No. PCT/EP2020/055678, filed on Mar. 4, 2020.

(30) Foreign Application Priority Data

Mar. 5, 2019 (EP) .................................... 19160833

(51) Int. Cl.
*F16K 11/052* (2006.01)
*F16K 31/06* (2006.01)
*F16K 31/10* (2006.01)

(52) U.S. Cl.
CPC ...... *F16K 11/0525* (2013.01); *F16K 31/0624* (2013.01); *F16K 31/10* (2013.01)

(58) Field of Classification Search
CPC ..... F16K 31/0624; F16K 11/525; F16K 31/10
See application file for complete search history.

(56) References Cited

U.S. PATENT DOCUMENTS 6,394,136 B1 * 5/2002 Rohrbeck ............. F16K 11/052
                                                              137/867
8,104,510 B2   1/2012 Ams et al.
(Continued)

FOREIGN PATENT DOCUMENTS

DE         20009969 U1   10/2001
DE    102007023799 A1    11/2008
(Continued)

OTHER PUBLICATIONS

International Search Report for International Application No. PCT/EP2020/055678, dated Apr. 24, 2020.
(Continued)

*Primary Examiner* — Umashankar Venkatesan
(74) *Attorney, Agent, or Firm* — Jason H. Vick; Sheridan Ross, PC

(57) ABSTRACT

A device for regulating the flow of a fluid comprises a valve housing having at least two valve ports, at least one valve seat, a valve member having a closing body, and an actuating unit for actuating the closing body. The valve member further comprises an actuation section, which is connected via at least one connecting web to the closing body for moving the closing body. A surrounding seal extends between the closing body and the actuation section, and separates the closing body and the actuation section from one another. The at least one connecting web is arranged such that the closing body is pivotable upon actuation of the actuation section by the actuating unit to move the valve member and thus the closing body relative to the at least one valve seat. The valve member is arranged to minimize, during the movement of the closing body, deformations in a passage area of the seal through which the at least one connecting web extends. A valve arrangement is provided with a respective device for regulating the flow of a fluid.

20 Claims, 8 Drawing Sheets

(56) References Cited

U.S. PATENT DOCUMENTS

| | | |
|---|---|---|
| 8,613,421 B2 | 12/2013 | Ams et al. |
| 9,115,820 B2 * | 8/2015 | Scheibe .............. F16K 37/0033 |
| 9,423,047 B2 * | 8/2016 | Vogt ................... F16K 31/0624 |
| 2009/0146091 A1 | 6/2009 | Ams et al. |
| 2011/0220824 A1 | 9/2011 | Ams et al. |
| 2013/0277592 A1 | 10/2013 | Scheibe |
| 2017/0314699 A1 | 11/2017 | Vogt et al. |

FOREIGN PATENT DOCUMENTS

| | | | |
|---|---|---|---|
| DE | 202012004020 U1 | 5/2012 | |
| DE | 202014001586 U1 * | 5/2014 | .......... F16K 11/0525 |
| EP | 2068056 A1 | 6/2009 | |
| EP | 2365239 A1 | 9/2011 | |
| EP | 3239572 A1 | 11/2017 | |
| WO | WO 2008/141690 | 11/2008 | |

OTHER PUBLICATIONS

Written Opinion for International Application No. PCT/EP2020/055678, dated Apr. 24, 2020.

International Preliminary Report on Patentability for International Application No. PCT/EP2020/055678, dated Sep. 16, 2021.

* cited by examiner

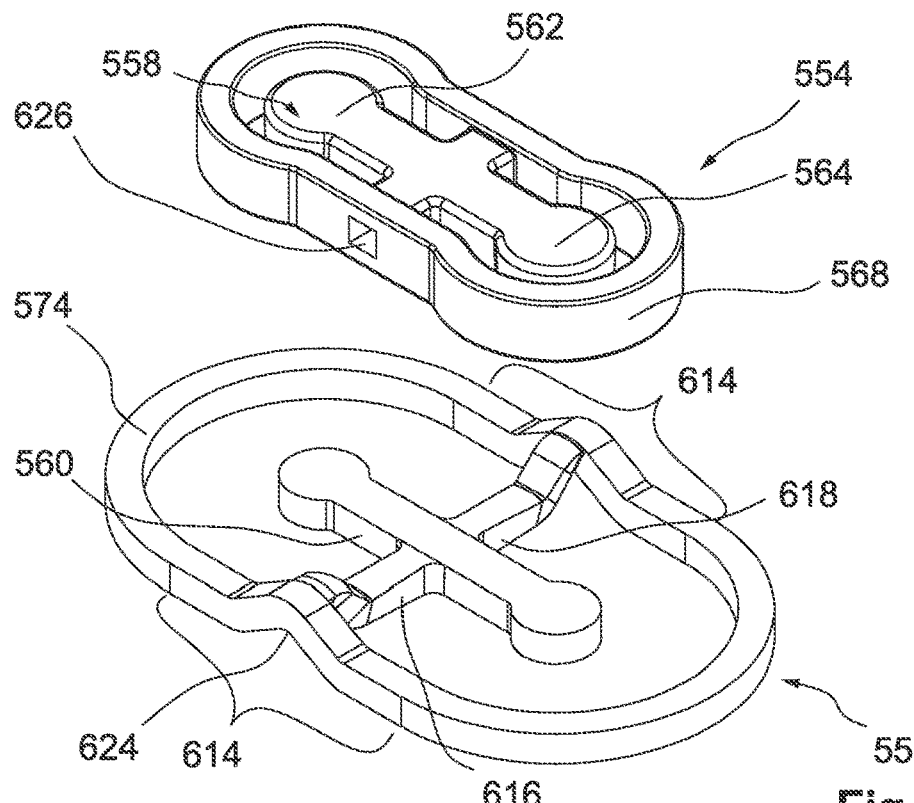
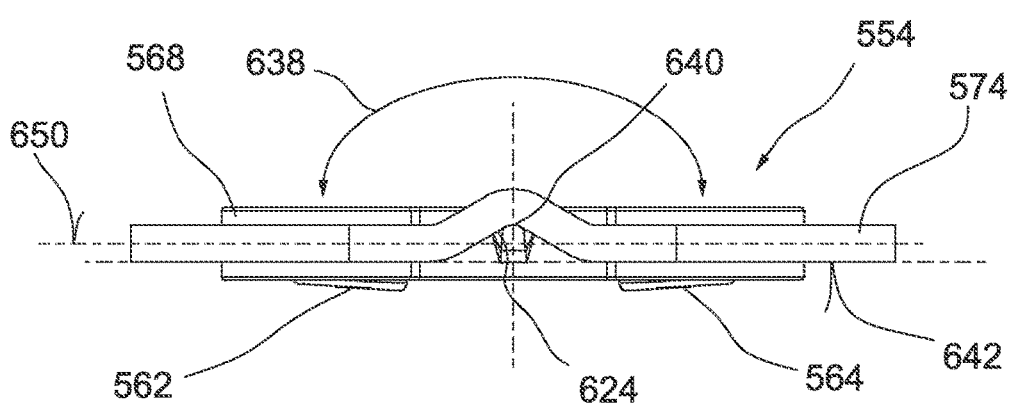
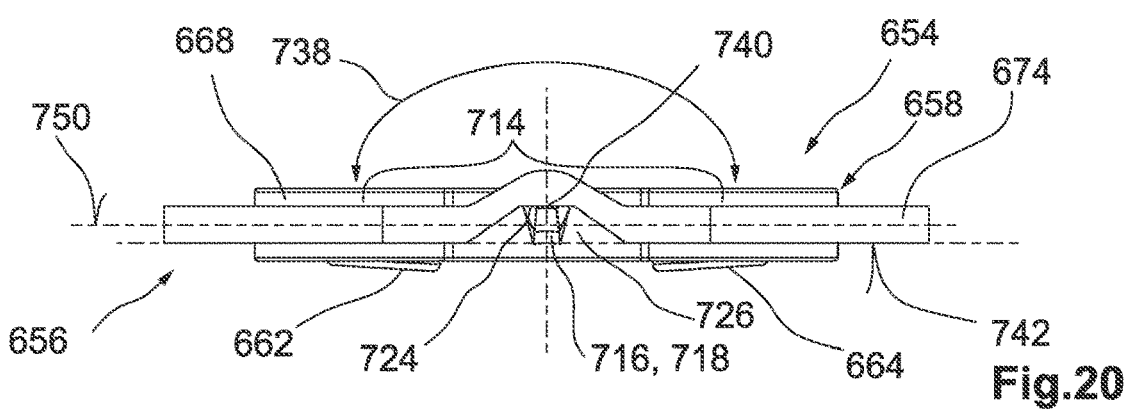

DEVICE FOR REGULATING THE FLOW OF A FLUID

CROSS-REFERENCE TO RELATED APPLICATIONS

This application is a continuation of international patent application PCT/EP2020/055678, filed on Mar. 4, 2020 and designating the U.S., which international patent application has been published in German language and claims priority to European patent application 19 160 833.0, filed on Mar. 5, 2019. The entire contents of these priority applications are incorporated herein by reference.

BACKGROUND

In some embodiments, the present disclosure relates to a device for regulating the flow of a fluid, comprising a valve housing with at least two valve ports, wherein in the valve housing at least one fluid path is formed, which extends between the at least two valve ports, at least one valve seat, which is assigned to the at least one fluid path, a valve member with a closing body, which can be coupled to the at least one valve seat to block or release the at least one fluid path, and an actuating unit for actuating the closing body, wherein the valve member further comprises an actuation section, which is connected via at least one connecting web with the closing body to move the closing body, wherein a surrounding seal extends between the closing body and the actuation section, which separates the closing body and the actuation section from each other, and wherein the at least one connecting web is arranged such that the closing body can be pivoted when the actuation section is actuated by the actuating unit to move the valve member and thus the closing body relative to the at least one valve seat.

At least in exemplary embodiments, the present disclosure relates to valves and valve arrangements, which are arranged as 3/2-way valves, i.e. as a valve having three ports and two switching positions. In exemplary embodiments, this can include a valve design having a switchover/reversal function. However, this does not preclude that the valves and valve arrangements are designed as 2/2-way valves in other exemplary embodiments, i.e. as a valve having two ports and two switching positions.

At least in exemplary configurations, the present disclosure relates to media-separated valves and valve arrangements. In the context of the present disclosure, a media-separated valve is a valve, in which the fluid (also referred to as medium) does not come into contact with parts of the valve actuation/actuating unit. Such valves and valve arrangements are designed, for example, in such a way that a hermetic seal is provided between the valve chamber and devices for actuating a valve member that is arranged in the valve chamber. Thus, in terms of design, no transfer of media from the valve chamber towards the actuating unit is possible. Media separated valves are suitable for medical, pharmaceutical and/or industrial applications with various media. Due to the media separation, such valves are also suitable for problematic/aggressive media.

From US 2013/0277592 A1, there is known a fluidic control element comprising a housing made up of two housing parts, between which a fluid space is formed, to which at least a first and a second flow channel lead, and a valve body that is pivotable in the fluid space and arranged as a combined sealing and actuating element that is formed as a two-armed lever, wherein each arm of the lever is able to close and open its associated flow channel in a respective end position, wherein the valve body comprises a supporting core, which is provided with a shaft, and an elastic sealing mantle, into which the shaft is embedded, at least in its bearing area in the housing, and wherein the shaft is rounded at least in the area, in which it is embedded in and adjoining the sealing ring.

From WO 2008/141690 A2, there is known a pump, comprising a pump head with a switching valve for switching the conveying direction, wherein the switching valve is arranged as a rocker valve with a rocker and rocker parts located on both sides of a rocker bearing, the switching valve having two separate chambers that are arranged next to one another, each of which having three fluid ports, two of which can be closed alternately by the rocker parts, wherein the switching valve further comprises a metal rocker core and a cover made of flexible material, and wherein the cover forms a partition wall in the area of a rocker bearing.

From DE 200 09 969 U1, there is known a diaphragm valve, comprising a valve body, a feed, a return and an outlet for a medium, two opposing seat nozzles, which are axially adjustable, a magnetic actuator whose stroke is adjustable, and a pivotably mounted switching lever, which interacts with a magnetic actuator via a lever attachment, and which has a pivot arm extending into a membrane for a seal that can be displaced between the seat nozzles.

At least in exemplary embodiments, the present disclosure relates to so-called flapper valves. Devices of the above-mentioned or similar type are known, for example, from US 2017/0314699 A1, US 2011/0220824 A1 and from US 2009/0146091 A1.

US 2009/0146091 A1 shows a valve arrangement for liquid or gaseous media, which has a valve member in the form of a so-called flapper. The valve member is arranged as an elastically mounted, deflectable flap. The valve member comprises a closing body, which can selectively close one of two valve seats and release the other. In this way, flow regulation can be achieved. The associated valve arrangement comprises three valve ports in a valve housing, which define two fluid paths, between which it is enabled to switch back and forth by means of the valve member and the closing body.

To actuate the valve, an electromagnet is provided, which comprises a tie rod that acts on a fork-like actuating element that is coupled to the closing body. The fork-shaped actuating element is arranged between the tie rod of the electromagnet and the closing body of the valve member, and provides a coupling between the two components. The electromagnet is arranged as a single-acting magnet. The electromagnet acts against the force of a closing spring. Thus, the valve arrangement can be operated in a powered state of the electromagnet in a first state and in a non-powered state of the electromagnet in a second state, which corresponding positions of the valve member are assigned.

US 2017/0314699 A1 shows a similar arrangement, but with two electromagnets being provided, which act additively on the closing body.

From US 2011/0220824 A1, a device for regulating the flow of a liquid or gaseous medium is known, which comprises a valve arrangement, which has a valve housing with three valve ports, with two fluid paths being defined between the three valve ports, which can be selectively activated or blocked by means of a deflectable valve member, which has a closing body,. The valve member comprises a closing body, which is approximately bell-shaped and can be pivoted and/or deflected to block a first valve port in a first position and a second valve port in a second position.

In addition to the closing body, the valve member also comprises a support, on which an actuation section is formed. The actuation section can be loaded and deflected approximately transversely to its longitudinal extension to pivot the closing body, similar to a bell.

US 2017/0314699 A1, US 2009/0146091 A1 and US 2011/0220824 A1 show valve arrangements, which allow a hermetic separation between a valve chamber, to which the valve ports lead, and the actuating unit. Such valve arrangements can also be referred to as media-separated valve arrangements. The hermetic separation between the valve chamber and the actuating unit enables the valve arrangements to be used in the medical and/or analytical environment.

In general, there is a need for compact-design valve arrangements that take up as little space as possible. Nevertheless, if possible, this should not result in any compromises in view of the performance of the valve arrangements. This applies for instance to the possible pressure ranges and/or flow ranges that can be safely switched and/or controlled with the valve arrangements.

Furthermore, there is a need for compact-design valve arrangements, which can provide such functionality even at very high pressure. This can possibly even include maximum pressures that are greater than pressure ranges that could previously be covered with known valves of the aforementioned type. It is desirable that valves and valve arrangements can be operated safely and at least with little leakage, or even leakage-free, in such high pressure ranges even under high dynamic loads.

In view of this, it is an object of the present disclosure to present a device for regulating the flow of a fluid and a valve arrangement provided therewith, which can be operated safely and reliably.

It is further object of the present disclosure to present a valve arrangement and a respective device that can be operated at high pressures with high dynamics/high switching frequencies.

It is a further object of the present disclosure to present a device that is arranged for low-leakage or even for leakage-free flow regulation.

It is a further object of the present disclosure to present a device that is arranged to be media-separated, so that a crossing and/or exit of the fluid/medium from the fluid chamber can be noticeably reduced or even completely avoided even at high pressure.

It is a further object of the present disclosure to present a valve arrangement, which is provided with such a device for flow regulation. In certain embodiments, the valve arrangement should cover an extended area of application, for instance with regard to pressure ranges and/or flow rates to be regulated.

It is a further object of the present disclosure to present a device and a corresponding valve arrangement, which have compact design and are space-saving.

SUMMARY

In regard of the device, these and other objects are achieved by a device for regulating the flow of a fluid, comprising
 a valve housing having at least two valve ports, wherein in the valve housing at least one fluid path is formed, which extends between the at least two valve ports,
 at least one valve seat, which is assigned to the at least one fluid path,
 a valve member having a closing body, which is configured to be coupled to the at least one valve seat to block or release the at least one fluid path, and an actuation section, which is connected via at least one connecting web with the closing body to move the closing body,
 an actuating unit that actuates the valve member,
 wherein a surrounding seal extends between the closing body and the actuation section, which separates the closing body and the actuation section from one another,
 wherein the at least one connecting web is configured such that the closing body is pivoted upon actuation of the actuation section by the actuating unit to move the valve member and thus the closing body relative to the at least one valve seat,
 wherein the at least one connecting web extends through a passage area of the seal; and wherein the valve member is arranged to minimize deformations in the passage area as the closing body is moved.

In certain embodiments, emphasis is placed on the fact that the passage area of the seal, i.e. the area, in which the connecting web forms a connection between the valve chamber and an interior of the valve chamber, respectively, and an exterior, in which the actuation takes place, is specifically sealed. It has been observed that established solutions can tend to leak, especially at high pressures and high switching frequencies.

One reason for this may be that the valve member is arranged similar to a rocker, i.e. that an actuation section of the valve member, on which the actuating unit acts, rolls over a bearing piece at the housing side. However, this means that a (momentary) pivot axis of the—usually flat—actuation section coincides with the facing surface of the actuation section. However, the valve member is often arranged in such a way that said surface of the actuation section is (in the neutral state of the valve member) at a parallel offset from a central plane/central plane through the seal and/or the connecting web. However, this often results in the connecting web being not pivoted about its longitudinal axis, which regularly coincides with the central plane/central plane through the seal. Instead, the connecting web is often pivoted about a pivot plane spaced apart from its longitudinal axis. However, this results in greater deflections/movements of the connecting web. This in turn results in increased deformations in the passage area of the seal. This can lead to leaks.

However, since the device is arranged in and/or at the area, in which the connecting web protrudes through the seal, in such a way that the seal is less deformed when the valve member is actuated, the likelihood of leaks decreases.

In certain embodiments, the at least one connecting web has a round cross section in the passage area of the seal. In certain embodiments, the actuation section can be pivoted by the actuating unit about a pivot axis, wherein a recess is formed in the actuation section that shifts the pivot axis of the valve member towards a central plane through the seal. in certain embodiments, an outer extension of the at least one connecting web is provided that extends beyond the actuation section, the extension having a round cross-section and being pivotably supported on a bearing seat at the valve housing.

In certain embodiments, the valve member has a deformation minimization contour, for instance at the at least one connecting web and/or the actuation section. A goal of the deformation minimizing contour is to minimize parasitic movements of the at least one connecting web with respect to the seal through which the at least one connecting web extends. Parasitic movements may occur when the valve member is pivoted by the actuating unit.

In exemplary embodiments, this means that the valve device is also suitable for high pressures (e.g. above 10 bar). There are exemplary configurations conceivable, in which the valve device is suitable for pressures of up to 50 bar or even higher. This also includes safe and leak-proof operation with high dynamics/switching frequency. This significantly expands the range of applications for such valves.

One approach to reducing leakages can consist in minimizing any distance between the actual pivot axis of the actuation section of the valve member and the longitudinal axis through the connecting web. If the connecting web is pivoted about its longitudinal axis, the deformations of the seal are reduced.

Another approach to reducing leakage can consist in forming the connecting web and the passage area of the seal, in terms of their cross-sections, in such a way that sharp corners and/or edges should be avoided and, if possible, replaced by round contours. If, for example, the connecting web has a round/cylindrical or at least rounded cross-section in the area of the seal, and if the passage area of the seal is adapted to it as far as possible, the pivoting movement of the connecting web in the passage area results in a favorable nestling between the connecting web and the passage area. As a result, there are fewer gaps and/or a more homogeneous pressure between the seal and the connecting web. This also leads to a lower tendency to leak.

In certain embodiments, there is provided a device for regulating the flow of a fluid having at least one connection web, wherein the at least one connecting web has a round cross section, for instance a circular cross section, at least in the passage area.

This aspect leads to a design, in which there are favorable contact conditions between the connecting web and the seal. By way of example, there are hardly any sharp edges/corners, so that the seal can seal sufficiently well even with a pivoting movement of the valve member and consequently of the connecting web. In exemplary embodiments, the round cross section is aligned with its central axis parallel to or coincident with the pivot axis of the valve member.

In certain embodiments, in a device for regulating the flow of a fluid, the valve member is pivotable about a pivot axis when actuated by the actuating unit, wherein the pivot axis is offset towards a central plane through the seal. In other words, the pivot axis is offset relative to the central plane towards the central plane. The distance to the central plane can be decreased. According to an exemplary embodiment, the central axis lies in the central plane, at least approximately. The offset of the pivot axis towards the central plane can be implemented by cranking and/or corresponding recesses in the area of the actuation section in the valve member. If the pivot axis of the valve member, with respect to the valve housing, and the longitudinal axis through the connecting web (which, at least in exemplary configurations, lies in the central plane) approach one another, the extent of the absolute movement of the connecting web is reduced when the device is switched over.

In accordance with this aspect, a design is possible, in which the pivot axis of the valve member and the longitudinal axis approach one another through the connecting web, which extends through the seal. This leads to a reduced movement of the connecting web in the passage area during the pivoting movement of the valve member, and consequently to less deformation.

In certain embodiments, in a device for regulating the flow of a fluid, the valve member comprises at least one bearing section having a round cross-section, which is adjacent to the actuation section, wherein the at least one bearing section is a part of the connecting web on a side of the actuation section that faces the closing body or an extension of the connecting web on a side of the actuation section that faces away from the closing body.

In accordance with this aspect, a design is possible, in which a bearing section having a round cross section is provided on the valve member, the longitudinal axis of which defines the pivot axis of the valve member. In certain embodiments, the longitudinal axis of the bearing section coincides with the longitudinal axis through the connecting web. In other words, the bearing section is formed, for example, in a partial area of the connecting web. According to a further exemplary embodiment, the bearing section is a kind of an extension of the connecting web to the outside (away from the closing body). In exemplary embodiments, the round cross section is aligned with its central axis parallel to or coincident with the pivot axis of the valve member.

It goes without saying that these aspects can be used in combination. Nevertheless, a contribution to the achievement of the object of the present disclosure arises already in isolation. A design according to these aspects can help minimizing deformations of the seal in the passage area during the movement of the closing body or the valve member.

In certain embodiments, the device can be configured as a 3/2-way valve. It is basically also conceivable to arrange the device as a 2/2-way valve. The device can be configured as a valve with a reversing function/switching function.

In an exemplary embodiment, a surrounding seal extends between the closing body and the actuation section, and hermetically separates the closing body and the actuation section from one another. In this way, the hermetic sealing can be achieved for media separation purposes. The closing body and the surrounding seal can be assigned to one and the same molded part. The molded part can be completely surrounded by the at least one connecting web. Generally, an elastic, sufficiently inert material is used for the closing body and/or seal. Examples are fluorinated rubber (FKM), perfluorinated rubber (FFKM), fluorosilicone rubber (FVMQ/MFQ), etc.

Surrounding components, for instance the valve housing, which defines a valve chamber, are also made from inert materials, for example from inert plastics, for example polyvinylidene fluoride (PVDF), polyether ether ketone (PEEK), etc. In the context of this disclosure, inert materials are those materials, which are at least sufficiently resistant with regard to the fluid path/medium to be regulated.

According to a further exemplary embodiment, the valve member can be pivoted about a pivot axis upon the actuation by the actuating unit, wherein the pivot axis is offset towards a central plane through the seal. Ideally, the pivot axis is in or close to the central plane through the seal. In exemplary embodiments, the goal is to align the pivot axis and the longitudinal axis with one another through the connecting web. In exemplary embodiments, there is no offset between the pivot axis and the longitudinal axis.

According to a further exemplary embodiment of the device, at least the actuation section or the connecting web is provided with a section comprising a cranking or a notch to define the offset of the pivot axis. This brings the pivot axis closer to the central plane. It goes without saying that two such elements and/or sections can be respectively provided.

According to a further exemplary embodiment of the device, the actuation section and/or the at least one connecting web are cranked to define the offset of the pivot axis. In this way, the (current) pivot axis is offset as desired, even upon a rolling movement. This will make the pivot axis brought closer to the central plane. The movement of the valve member, for instance of the closing body, can include a rolling movement of the actuation section relative to the valve housing. This is the case when there is no fixed pivot bearing, but instead there is a rolling movement via a bearing piece. This includes a movement with a "wandering" pivot axis, i.e. with an instantaneous pivot axis. Alternatively, the movement of the valve member, for instance of the closing body, can comprise a pivot movement about a fixedly defined pivot axis.

In this way, the desired offset of the pivot axis and/or its approach to the longitudinal axis of the connecting web can be achieved.

In general, the offset of the pivot axis towards the central plane can be achieved by a cranking (of the otherwise flat actuation section and/or connecting web). It is also conceivable to make a notch. It is also conceivable to provide a recess in the actuation section or adjacent thereto to arrange the pivot axis in the desired position.

It is conceivable to initially make the actuation section, and/or a framework of the valve member comprising the actuation section, as a semi-finished product in the form of a stamped part, for example as a one-piece, essentially flat stamped part. The desired offset of the resulting pivot axis can then be generated by reshaping. Furthermore, a forming process can be used to provide the connecting web at least partially with a round/circular cross-section.

It is also conceivable to produce a framework and/or an actuation section of the valve member by means of a material removing process. By way of example, this may comprise a first step for producing a stamped part and a machining step for producing the desired contour. This can include manufacturing a semi-finished product by means of etching or an electrochemical process, with the desired contours (round cross-section and/or offset for the pivot axis) being introduced into the semi-finished product by another process, such as a forming process and/or a material removing machining process.

It is also conceivable to produce the framework and/or the actuation section of the valve member partially or completely by means of an electrochemical manufacturing process or an etching process. This may therefore include producing a semi-finished product in the form of a base body, into which the desired offset for the pivot axis is then introduced via a forming process (stamping, bending, drawing).

It is also conceivable to form the offset area by a recess in the framework, the recess being introduced into a semi-finished product by an etching process or a similar removal process. The semi-finished product can in turn be obtained from thin-walled material/sheet material by means of etching, punching and/or other removing/separating processes.

The frameworks are therefore not only designed as flat parts, at least in certain embodiments, but provided with a round cross section and/or a notch/cranking, at least sectionally in the area of the connecting web or the connecting webs.

With regard to the media separation, embodiments are conceivable, which involve a hermetic separation between the framework, for instance with regard to the support bar and connecting web(s) thereof, and the interior of the valve chamber. For example, the support bar and connecting web(s) are completely enclosed within the valve chamber by the closing body and/or the seal. In other words, the support bar and connecting web(s)—within the valve chamber—are embedded in the elastic material of the closing body and/or the seal.

According to a further exemplary embodiment of the device, the actuation section and/or the at least one connecting web are provided with a notch to define the offset of the pivot axis. This will make the pivot axis brought closer to the central plane. The notch can comprise a recess and/or a cranking. It is also conceivable to move the area of the connecting web, which protrudes through the seal, relative to the actuation section. It is also conceivable to provide the actuation section at least partially with a notch/cranking.

According to a further exemplary embodiment of the device, the at least one connecting web comprises a round cross section, for instance a circular cross section, at least in the passage area. This leads to a favorable contact condition between the connecting web and seal. In this way, gaps and the leaks associated therewith are reduced or even avoided in high pressure applications.

On the one hand, this can relate to the sealing effect between the connecting web and the seal. On the other hand, this can relate to the sealing effect between the seal and the associated seat (receiving groove) in the valve housing. In the latter case, too, movements of the connecting web in the passage area can affect the tightness.

According to a further exemplary embodiment of the device, the valve member can be pivoted about a pivot axis, which is adjacent to a central axis/longitudinal axis of the at least one connecting web in the passage area. In certain embodiments, the pivot axis coincides with the central axis/longitudinal axis. If there is no or only a small distance between the central axis and the pivot axis, the range of the relative movement between the connecting web and the passage area during the pivoting movement of the valve member about the pivot axis is reduced.

According to a further exemplary embodiment of the device, a pivot axis (or the pivot axis) of the valve member is defined by the at least one connecting web and a corresponding bearing piece at the valve housing. According to exemplary embodiments, this includes a coincidence of the longitudinal axis through the connecting web and the pivot axis. In other words, in exemplary configurations, the connecting web initially also serves as a bearing element for the valve member, at least sectionally. In an exemplary embodiment, the connecting web is accordingly provided with a round cross section in the area that is used for a bearing function. If a corresponding seat is then provided on the valve housing, a fixed pivot axis can be defined, about which the valve member (at least the actuation section and the closing body connected thereto) can be pivoted. If this pivot axis coincides with the longitudinal axis/central axis of the connecting web, there are only slight relative movements between the connecting web and the seal in the passage area through the seal. In exemplary embodiments, the round cross-section is aligned with its central axis parallel to or coincident with the pivot axis of the valve member.

According to a further exemplary embodiment of the device, the connecting web is guided in the bearing piece on the valve housing, at least in a bearing section that is provided with a round cross section. The bearing piece can therefore provide a seat for the bearing section. This defines the pivot axis. In exemplary embodiments, the round cross section is aligned with its central axis parallel to or coincident with the pivot axis of the valve member.

This configuration is a departure from the pure rocker function, in which an actuation section of the valve member rolls on a bearing piece on the valve housing. In this arrangement, the pivot axis "wanders", so there are different instantaneous pivot axes depending on the position of the valve member.

According to a further exemplary embodiment of the device, an extension of the connecting web is formed on a side of the actuation section facing away from the closing body, wherein the extension is guided in the seat on the valve housing and provided with a round cross section. The extension can accordingly also be used and/or referred to as a bearing section. The extension can interact with a corresponding seat so that a favorable pivot axis is defined. In an exemplary embodiment, the extension is arranged on the outside of the actuation section from the perspective of the closing body and facing away from the closing body. In exemplary embodiments, the round cross section is aligned with its central axis parallel to or coincident with the pivot axis of the valve member.

According to a further exemplary embodiment of the device, the actuation section is part of an actuating frame, which surrounds the closing body, two opposing connecting webs extending between the actuating frame and the closing body. This design reduces lateral forces. The operating force is distributed more conveniently. If there are two opposing connecting webs, two bearings for the movement can be formed accordingly. The further apart the two bearing points are from one another, the more precisely the pivot axis can be defined and the pivoting movement can be guided.

The actuating frame can also be referred to as a frame or frame part and/or as a border piece. When the actuating frame surrounds the closing body, the rigidity of the valve member is increased. This supports direct and precise control. The actuating frame is designed oval or oblong with a surrounding edge.

According to a further exemplary embodiment of the device, the valve member comprises a support bar, wherein the support bar, the at least one connecting web and the actuation section are firmly connected to one another and/or form part of an integrally designed framework. In an exemplary embodiment, the support bar is designed in one piece as an essentially flat component. The framework can be produced, for example, by means of stamping, etching and/or some other erosive and/or separating process. Contours for the desired relocation of the pivot axis are introduced towards the central axis of the connecting web, and can be generated via suitable forming processes and/or material removing processes.

The support bar and the actuating frame of the framework can extend essentially in a plane. By way of example, the support bar and the actuating frame are with their long sides aligned with one another in a common plane. The support bar comprises, for example, two ends, which are each assigned to a sealing section of the closing body. A distance between the two ends defines a longitudinal extension of the support bar and the valve member, at least in exemplary embodiments. In one embodiment, two connecting webs couple to the support bar in an intermediate region between the two ends to connect the support bar and the actuating frame to one another.

In an exemplary embodiment, the framework comprises the actuating frame, which surrounds the support bar, wherein the support bar is formed in an inner region defined by the actuating frame, and wherein the support bar is connected to the actuating frame via two connecting webs. In an exemplary embodiment, the two connecting webs are arranged laterally of the support bar. The two connecting webs can jointly define a longitudinal axis/central axis, which is parallel to the pivot axis of the valve member. In exemplary embodiments, the pivot axis of the valve member coincides with the longitudinal axis through the connecting webs.

According to a further exemplary embodiment of the device, at least the support bar or the actuating frame defines with their longitudinal extension the central plane. According to this embodiment, the framework is designed to be at least basically flat. A central plane (which divides the thickness of the flat piece into two equally thick subsections) through this flat piece forms the middle plane in this embodiment. At least in exemplary configurations, the central plane also corresponds to a central plane through the longitudinal extension of the seal. According to further exemplary embodiments, the central plane is defined at least by the flat extension of the support bar. According to further exemplary embodiments, the central plane is defined at least by the flat extension of the closing body. According to further exemplary embodiments, the central plane is defined at least by the flat extension of the seal.

According to a further exemplary embodiment of the device, the valve member has at least one bearing section having a round cross section, which is adjacent to the actuation section, wherein the at least one bearing section is a part of the connecting web on a side of the actuation section, which is facing the closing body, or an extension of the connecting web on a side of the actuation section, which is facing away from the closing body. In exemplary embodiments, the round cross section is aligned with its central axis parallel or congruent to the pivot axis of the valve member.

In exemplary embodiments, the bearing section is therefore a sub-section of the connecting web or connecting webs. Accordingly, with a surrounding frame, the valve member is mounted in an area between two legs of the frame on the valve housing. In this area, for example, two connecting webs are arranged that connect the frame to the support bar.

According to an alternative embodiment, the valve member is mounted on the valve housing via two pins, which are formed outside the surrounding frame as an extension of the connecting webs (formed within the surrounding frame).

According to a further exemplary embodiment of the device, the valve housing comprises three valve ports, wherein two fluid paths are formed in the valve housing, which extend between the three valve ports, wherein the device further comprises two valve seats, one of which being respectively assigned to one of the two fluid paths, wherein the closing body comprises two sealing sections, one of which being respectively assigned to one of the two valve seats, and wherein the valve member can be pivoted to alternately release or block one of the two valve seats. In other words, at least in exemplary configurations, the valve is arranged as a 3/2-way valve having a reversing function.

In regard of the valve arrangement, there is presented a valve arrangement, which comprises a device for flow regulation according to at least one of the embodiments described herein. By way of example, such a valve arrangement is configured as a seat valve arrangement, flapper valve arrangement, membrane valve arrangement, or as a separating lever valve arrangement. Combinations thereof are conceivable.

It is to be understood that the previously mentioned features and the features of the present disclosure that are mentioned in the following may not only be used in a certain combination, but also in other combinations or as isolated features without departing from the scope of the present disclosure.

BRIEF DESCRIPTION OF THE DRAWINGS

Further features and advantages of the present disclosure are disclosed by the following description of a plurality of preferred embodiments, with reference to the drawings, wherein:

FIG. 18 is an exploded perspective view of a further embodiment of a valve member;

FIG. 19 is a simplified side view of the valve member according to FIG. 18; and

FIG. 20 is a simplified side view of an embodiment of a valve member that is modified in comparison to the illustration in FIG. 19.

EMBODIMENTS

Figure 1:
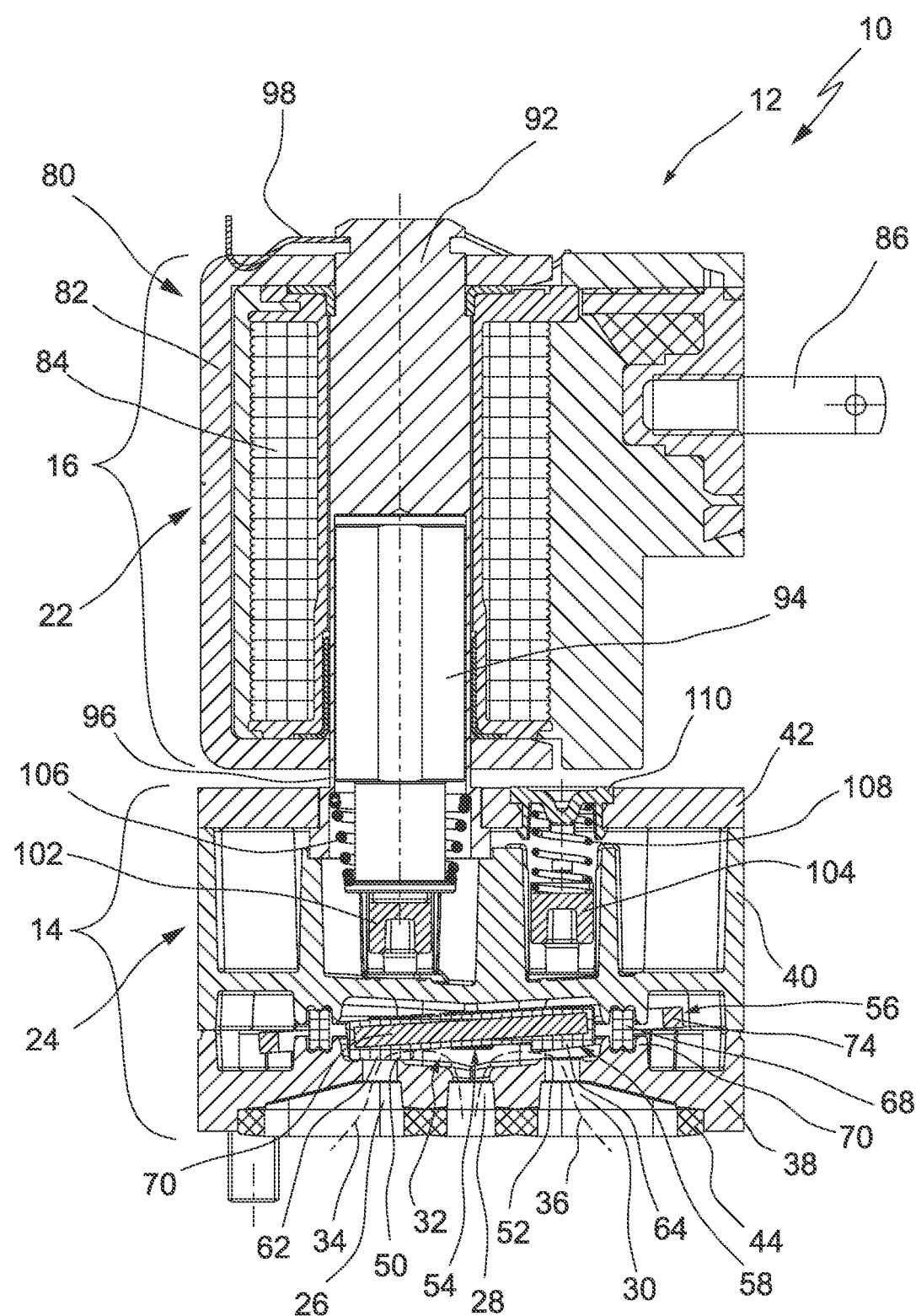
FIG. 1 is a sectional side view through an embodiment of a valve arrangement.

With reference to a perspective illustration, FIG. 1 elucidates an exemplary embodiment of a valve arrangement that is denoted in its entirety by 10. The exemplary embodiment of the valve arrangement 10 is additionally illustrated in FIGS. 2 to 5. It is understood that the valve arrangement 10 can also be arranged differently. In this respect, constructive details, which are elucidated below for illustrative purposes, are not to be understood to be limiting. An exemplary embodiment of the valve arrangement 10 is illustrated with reference to FIG. 1 and with additional reference to FIGS. 2 to 4.

It goes without saying that individual features of the exemplary embodiments illustrated below can also be combined with one another in other ways, i.e. can also be used in other embodiments. By way of example, this applies to detailed designs for minimizing the susceptibility to leakage and consequently to optimize the high pressure suitability of the valve arrangement 10.

The valve arrangement 10 comprises a device 12 for flow regulation. The device 12 can also be referred to as a valve or valve unit. The device 12 comprises a valve section 14 and an actuation section 16. In the illustrated exemplary embodiment, there is a structural delimitation between the actuation section 16 and the valve section 14. The actuation section 16 comprises an actuation housing 22. The valve section 14 comprises a valve housing 24.

In the exemplary embodiment as a 3/2-way valve according to FIGS. 1 to 4, the device 12 comprises three ports 26, 28, 30, which lead into a valve chamber 32. In an exemplary embodiment as a valve with hermetic media separation, the valve chamber 32 is sealed off from the environment, and for instance also from the actuating unit 16. The three ports 26, 28, 30 define two valve paths 34, 36. The valve path 34 connects the ports 26 and 28. The valve path 36 connects the ports 28 and 30. The valve paths 34, 36 extend through the valve chamber 32.

Figure 2:
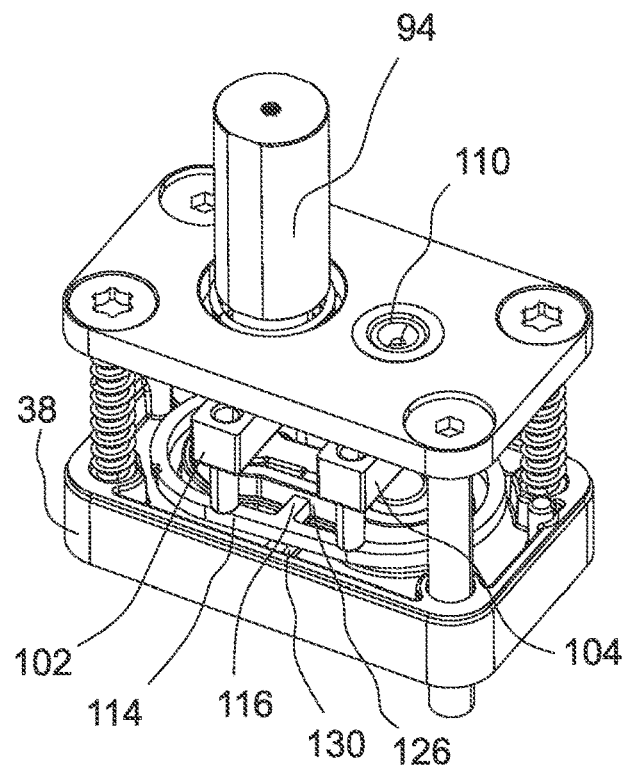
FIG. 2 is a perspective partial view of the arrangement according to FIG. 1, with elements of the valve arrangement hidden for illustrative purposes.
Figure 3:
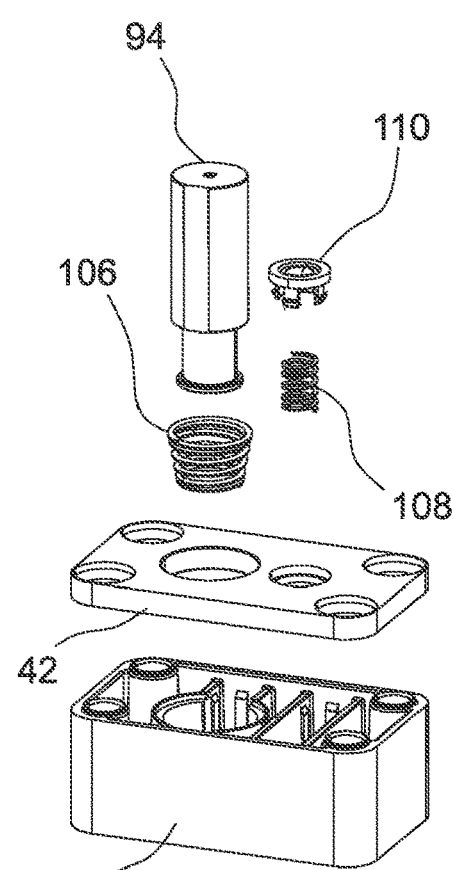
FIG. 3 is a partial perspective view of a valve member for use in the valve arrangement shown in FIGS. 1 and 2.
Figure 3:
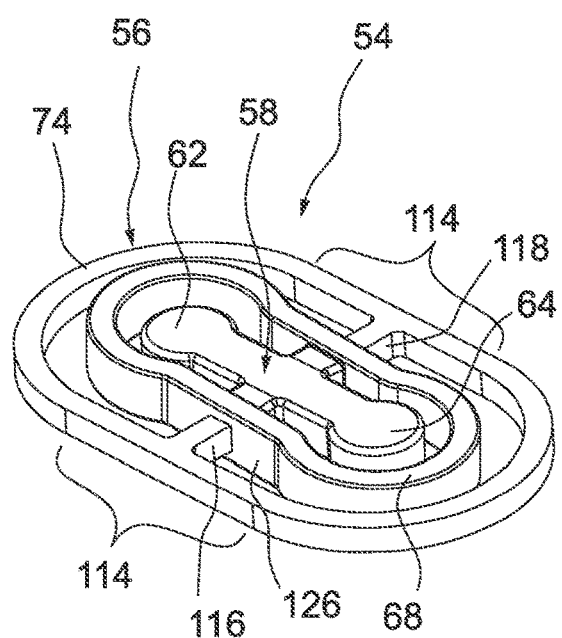
Figure 4:
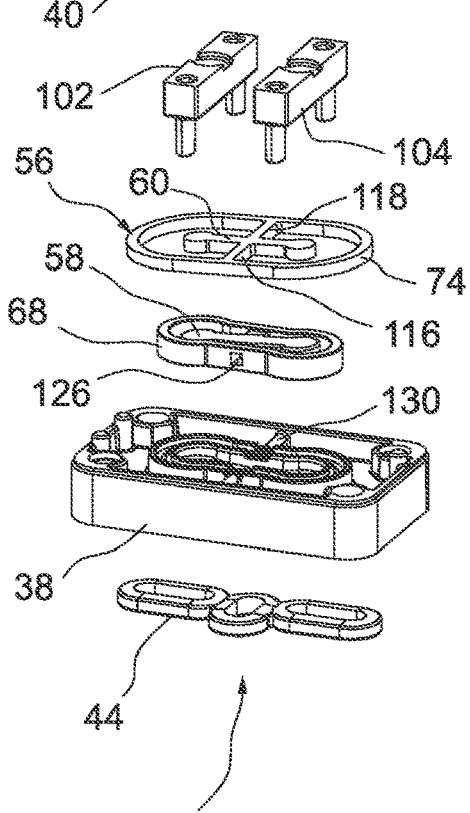
FIG. 4 is an exploded perspective partial view of the valve arrangement illustrated in FIGS. 1 to 4, with elements of the valve arrangement hidden for illustrative purposes.

In the exemplary embodiment according to FIGS. 1 to 4, the valve housing 24 has a multi-part design. In one embodiment, this includes a housing part 38, a further housing part 40 and a cover 42, see also FIG. 4. The housing part 40 is arranged between the housing part 38 and the cover 42. The cover 42 closes the valve housing 24 towards the actuating unit 16. With reference to the orientation in FIG. 1, the housing part 38 can be referred to as the lower housing part, at least in the illustrated embodiment. Accordingly, the housing part 40 can be referred to as the upper housing part. Furthermore, FIG. 4 illustrates, in conjunction with FIG. 1, a seal 44 for the ports 26, 28, 30.

Two valve seats 50, 52 are formed in the valve housing 24, for instance in the housing part 38. The first valve seat 50 is assigned to the path 34. The second valve seat 52 is assigned to the path 36. The device 12 comprises a valve member 54, which is arranged in the valve housing 24, and which can be alternately coupled to the first valve seat 50 and the second valve seat 52 to alternately block or release one of the two paths 34, 36. FIG. 3 shows a perspective isolated illustration of the valve member 54.

The valve member 54 comprises a framework 56, see also FIG. 4. The framework 56 is formed, for example, from a flat material, for example a sheet metal material. In the embodiment illustrated in FIGS. 1 to 4, the framework 56 is the coupling element between the actuating unit 16 and the desired position of the valve member 54 for opening or closing the paths 34, 36.

In addition to the framework 56, the valve member 54 comprises a closing body 58. The framework 56 comprises a support bar 60, which is embedded in and carries the closing body 56. The closing body 58 is made of a sufficiently elastic material. In certain embodiments, the elastic material is media-resistant (in relation to the use with the intended fluid). A first sealing section 62 for the first valve seat 50 is formed on the closing body 58. Further, a second sealing section 64 for the second valve seat 52 is formed on the closing body 58. The sealing section 62 can block the valve seat 50. The sealing section 64 can block the valve seat 52. In the switching position shown in FIG. 1, the sealing section 62 makes contact with the valve housing 24 in the area of the valve seat 50, so that the path 34 is blocked. In contrast, the path 36 is released in this position, since the sealing section 64 is lifted off the valve seat 52. A fluid flow can be established between the ports 28 and 30.

FIG. 3 and FIG. 4 show that the closing body 58 is further provided with or coupled to a surrounding seal 68. At least in exemplary configurations, the closing body 58 is arranged integrally and in one piece with the seal 68 and the sealing section 62, 64. This implies that the seal 68 and the sealing sections 62, 64 are made of the same material.

The surrounding seal 68 can also be referred to as a housing seal. The sealing sections 62, 64 can also be referred to as seat seals. In the embodiment illustrated in FIGS. 1 to 4, the valve housing 24 comprises a seat 70 for the seal 68 between the housing part 38 and the housing part 40. The seat 70 comprises, for example, a first groove at the housing part 38 and a second groove at the housing part 40, the two grooves corresponding to one another and receiving the seal 68 therebetween. Other designs are conceivable.

An actuating frame or frame 74 is also formed on the framework 56 of the valve member 54. The frame 74 surrounds and/or encloses the support bar 60. Between tween the frame 74 and the support bar 60, the seal 68 is arranged. The seal 68 surrounds and/or encloses the support bar 60. The frame 74 surrounds and/or encloses the seal 68.

FIG. 1 further illustrates an exemplary configuration of the actuating unit 16. The housing 22 of the actuating unit 16 houses an electromagnet 80, which can generally also be referred to as an actuator. The electromagnet 80 has a yoke 82 and a coil 84. In FIG. 1, a connector for the coil 84 is indicated by 86. It should be understood that there are at least two connectors 86 for the coil 84. The electromagnet 80 further comprises a fixed armature part 92 and a movable armature part 94. The movable armature part 94 can be moved relative to the fixed armature part 92 in a sleeve 96. In this way, the electromagnet 80 can cause a stroke, via which the valve member 54 of the valve section 14 can be controlled. Further, in FIG. 1, 98 indicates a fastening, which braces the fixed armature part 92 against the yoke 82.

The movable armature part 94 is coupled to an actuating element 102. In the illustration shown in FIGS. 1 to 4, the actuating element 102 is actuated centrally by the movable armature part 94. The actuating element 102 has two legs, which are spaced apart from one another and which, if necessary, act on the frame 74 to control the valve member 54. The actuating element 102, which is controllable via the electromagnet 80, is assigned to the first sealing section 62 and the first valve seat 50. Furthermore, a second actuating element 104 is provided in the device 12, which is not actuated directly by the electromagnet 80. The second actuating element 104 is assigned to the second sealing section 64 and the second valve seat 52. A return spring 106 is provided for the actuating element 102. A return spring 108 is provided for the actuating element 104. In FIG. 2 and FIG. 4, a plug designated by 110 is also shown, which secures the position of the return spring 108 at the valve housing 24.

When the movable armature part 94 of the electromagnet 80 is attracted towards the fixed armature part 92, the actuating element 102 no longer urges the sealing section 62 onto the valve seat 50. Instead, the force of the return spring 108 acts on the actuating element 104 to urge the sealing section 64 towards the valve seat 52. This is accompanied by the result that the sealing section 62 is lifted off the valve seat 50.

It can also be seen from FIGS. 2 to 4 that, at least in the exemplary embodiment illustrated, an actuation section 114 is provided on the frame 74 of the framework 56 of the valve member 54. The actuation section 114 is the region of the frame 74 and/or the framework 56, in which the actuating element 102 or the actuating element 104 can act on the valve member 54. For example, two actuation sections 114 are provided on the frame 74 on opposite sides, on which the actuating elements 102, 104 can act with their legs.

At least one connecting web 116, 118 extends between the frame 74 and the support bar 60 of the framework 56. In the exemplary embodiment according to FIGS. 1 to 4, two opposing connecting webs 116, 118 are provided, which are arranged on opposite sides of the support bar 60 and extend on each of the two sides between the support bar 60 and the frame 74. The connecting webs 116, 118 connect the support bar 60 to the frame 74, for instance to the actuation section 114. Accordingly, when the frame 74 is actuated, movements (pivoting movements) are transmitted via the connecting webs 116, 118 to the support bar 60 and consequently to the closing body 58 with the sealing sections 62, 64 received thereon.

FIGS. 3 and 4 further illustrate that in this embodiment, the connecting webs 116, 118 protrude through the seal 68 in a passage area 126. In this way, the seal 68 enables the desired hermetic (fluidic) separation between the valve chamber 32 and the actuating unit 16 and even the actuating elements 102, 104. However, the connecting webs 116, 118 allow a movement transmission/torque transmission starting from the actuation section 114 towards the support bar 60 and consequently the closing body 58. This transfer takes place in the passage area 126 through the (ideally completely or almost completely sealing) seal 68. When the valve member 54 moves, there is consequently a relative movement between the connecting web 116, 118 and the seal 68. FIG. 3 shows that the connecting webs 116, 118 between the frame 74 and the support bar 60 are embedded in the material of the closing body 58.

FIGS. 2 and 4 further illustrate that a support piece or bearing piece 130 for the valve member 54 is provided on the valve housing 24, for example on the housing part 38. The position of the valve member 54 in the valve housing 24 can be defined on the one hand via the arrangement/design of the seal 68 and the associated seat 70 on the valve housing 24. However, a pivot axis is also required for the pivoting movement of the valve member 54. In the exemplary embodiment shown in FIGS. 1 to 4, the valve member 54 can roll over the bearing piece 130 in a manner similar to a rocker. In this way, an instantaneous pivot axis for the valve member 54 results, depending on the current pivot position.

The exemplary embodiment of a valve arrangement 10 and/or device 12 illustrated above with reference to FIGS. 1 to 4 forms the basis for the embodiments of valve members and their arrangement/function in the valve housing illustrated hereinafter with reference to FIGS. 5 to 20. Unless the differences are explicitly discussed, it is assumed that the embodiments of valve members illustrated below are suitable for use in the valve arrangement 10 according to FIGS. 1 to 4 and/or that the skilled person can readily apply respective modification operations, e.g. to the valve housing 24. Therefore, the further detailed configuration of the actuating unit 16 and the valve member 14 of the respective device 12 will not be discussed in detail in the following.

Figure 8:
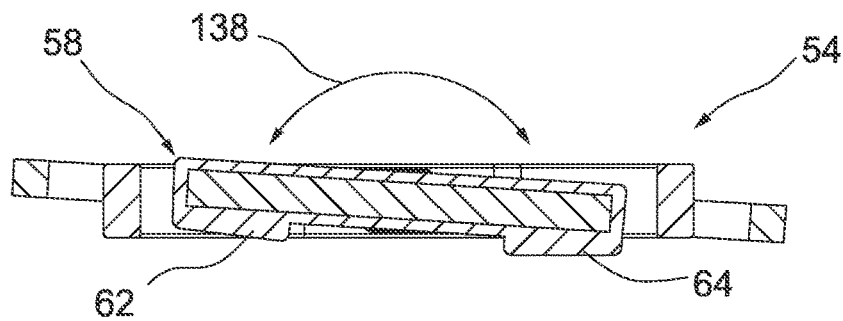
FIG. 8 is a further view of the arrangement according to FIG. 7, in a second switching position of the valve member.
Figure 7:
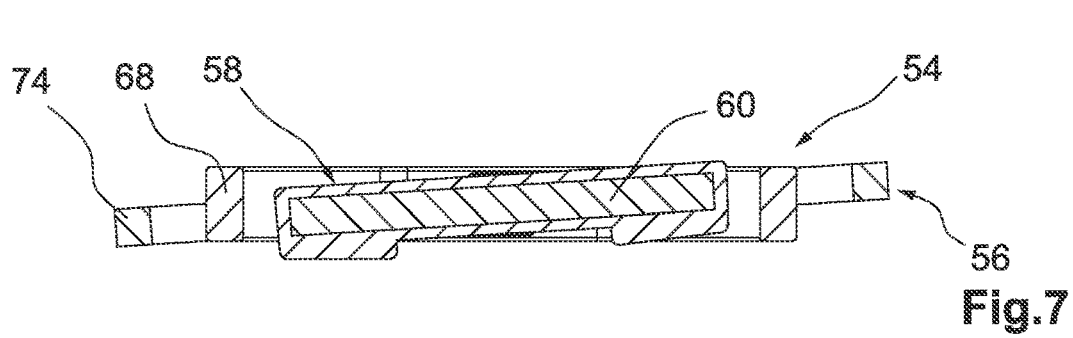
FIG. 7 is a sectional view of the valve member according to FIG. 5 along the line VII-VII in FIG. 5, in a first switching position.
Figure 6:
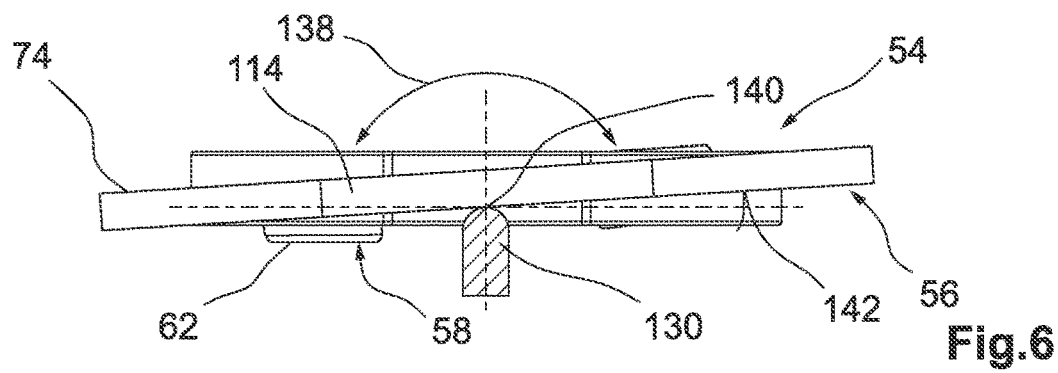
FIG. 6 is a side view of the valve member according to FIG. 5 to illustrate a pivoting movement.
Figure 5:
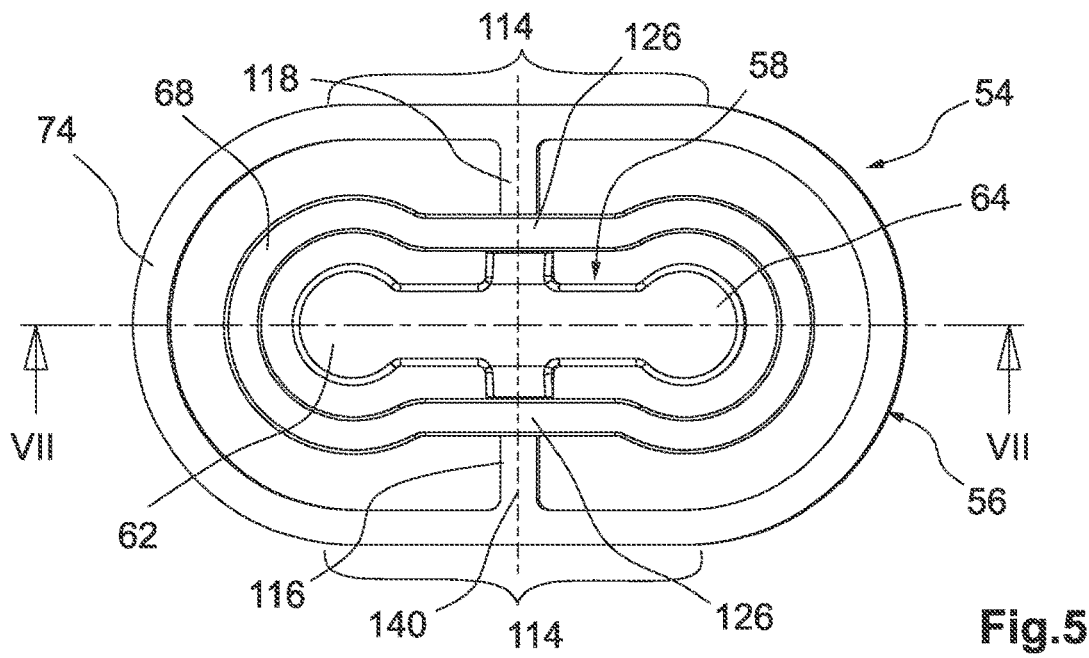
FIG. 5 is a plan view of an embodiment of a valve member for use in a valve arrangement.

With reference to FIGS. 5 to 8 and with additional reference to the general design of the valve arrangement 10 according to FIGS. 1 to 4, an exemplary design of a valve member 54 and its behavior during operation of the device 12 and/or the valve arrangement 10 for regulating a fluid is described. FIG. 5 illustrates a plan view of the valve member 54 (from the perspective of the actuating unit 16). FIG. 6 is a side view thereof. FIGS. 7 and 8 are cross-sectional side views of the valve member 54 in two operating states/switching positions.

In FIG. 6 there is further provided a simplified representation of a support piece and/or bearing piece, which is designated by 130, and which is assigned to the valve housing (see reference numeral 24 in FIG. 1). The bearing piece 130 according to the embodiment according to FIGS. 5 to 8 defines an area over which the valve member 54 (at least its frame 74 and/or framework 56) can roll. This takes place during a pivoting movement of the support bar 60 and consequently of the closing body 58 for switching over the valve member 54 and thus the valve section 14 of the device 12. The pivoting movement/rolling movement is illustrated in FIGS. 6 to 8. FIGS. 7 and 8 each show a cross-section through the valve member 54, the closing body 58 and the support bar 60 being arranged in the plane of the cross-section. FIG. 7 illustrates a first position of the valve member 54, in which the sealing section 62 of the closing body 58 can block a valve seat assigned thereto. In contrast, FIG. 8 illustrates a second position of the valve member 54, in which the sealing section 64 of the closing body 58 can block a valve seat assigned thereto.

For the transition between the states according to FIG. 7 and FIG. 8, the valve member 54 is actuated and at least partially pivoted, compare in this connection the curved double arrow 138 in FIG. 6. This pivoting movement and/or switching movement is triggered by actuating the frame 74 in the respective actuation section 114. The frame 74 and/or the entire framework 56 rolls over the bearing piece 130 in the valve housing. This rolling movement/rolling movement takes place about a pivot axis 140. In the embodiment illustrated in FIGS. 5 to 8, the pivot axis 140 is an instantaneous (wandering) pivot axis. The pivot axis 140 is defined by a respective contact between the actuation section 114 and the bearing piece 130.

The movement of the actuation section 114 at the frame 74 is transmitted via the connecting webs 116, 118 to the support bar 60 and consequently to the closing body 58. The connecting webs 116, 118 extend through the seal 68, specifically through a passage area 126 of the seal 68. In the plan view shown in FIG. 5, the seal 68 surrounds the support bar 60 with the sealing sections 62, 64 of the closing body 58 received thereon. In FIG. 5, it is further illustrated that the valve member 54 according to this exemplary embodiment is designed symmetrically to the sectional plane VII-VII. On each of the two sides of this central plane VII-VII, one of the two connecting webs 116, 118 extends through a corresponding passage area 126 of the seal 68. Each of the connecting webs 116, 118 extends between the (inner) support bar 60 and the (outer) frame 74 to connect them to one another in a sufficiently rigid manner. In this way, an actuating movement can be introduced into the actuation section 114 of the frame 74 and transmitted to the support bar 60 via the connecting webs 116, 118.

However, the embodiment illustrated in FIGS. 5 to 8 leads to the (actual) pivot axis 140 being spaced away from a central plane of the frame 74 and/or framework 56 and a longitudinal axis by the connecting webs 116, 118. In the embodiment shown in FIG. 6, a support surface 142 on the side of the frame 74 that faces the bearing piece 130 defines the pivot axis 140. Accordingly, there is an offset between the pivot axis 140 and a center axis through the framework 56, which in the exemplary embodiment according to FIGS. 5 to 8 is approximately half the thickness of the framework 56.

Figure 9:
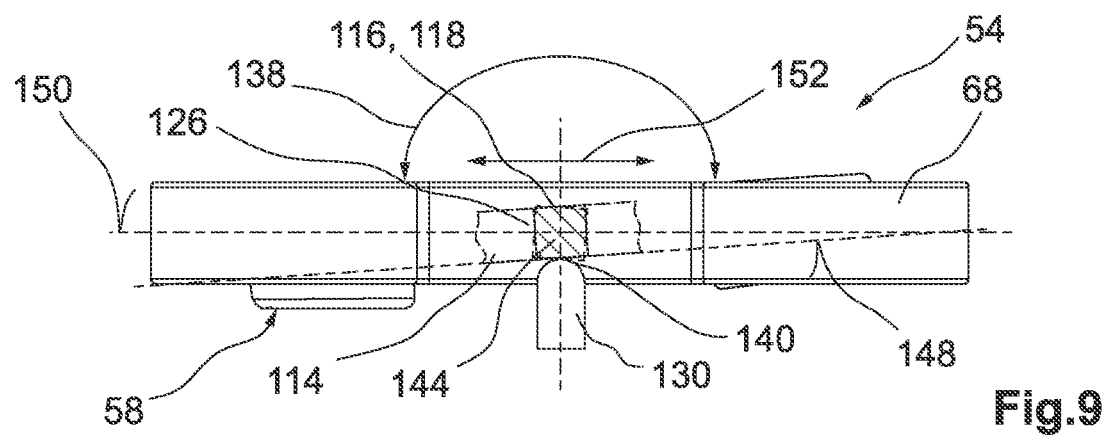
FIG. 9 is a simplified side view of an embodiment of a valve member to illustrate an arrangement of a connecting web and a bearing piece.

In this context, FIG. 9, in addition to FIGS. 5 to 8, illustrates the effects of such an offset between the pivot axis 140 and such a central plane 150 through the frame-work 56 (or the frame 74 and/or the connecting webs 116, 118). In FIG. 9, 148 indicates an instantaneous inclination/pivot position of a contact surface (compare 142 in FIG. 6) of the framework 56 with respect to the bearing piece 130. The embodiment illustrated in FIG. 9 involves a quadrangular cross section 144 at the connecting webs 116, 118. With this angular cross section 144, the connecting web 116, 118 respectively makes contact with the passage area 126 through the seal 68. If the frame 74 is now pivoted over the actuation section 114, but the seal 68 is at the same time sealingly accommodated in the valve housing 24 (see FIGS. 1 and 4), there is a relative movement between the connecting webs 116, 118 and the seal 68 in the passage area 126.

This relative movement, in conjunction with the angular cross-section 144 of the connecting webs 116, 118, may lead at a sufficiently high pressure in the valve chamber 32 (FIG. 1) to leakage and leaks between the connecting webs 116, 118 and the seal 68. In FIG. 9, a double arrow 152 illustrates a so-called as a parasitic relative movement (transverse movement) between the connecting webs 116, 118 and the passage area 126 surrounding them in the seal 68. Even if the parasitic movement is only small, this can very well increase the tendency to leak.

Figure 10:
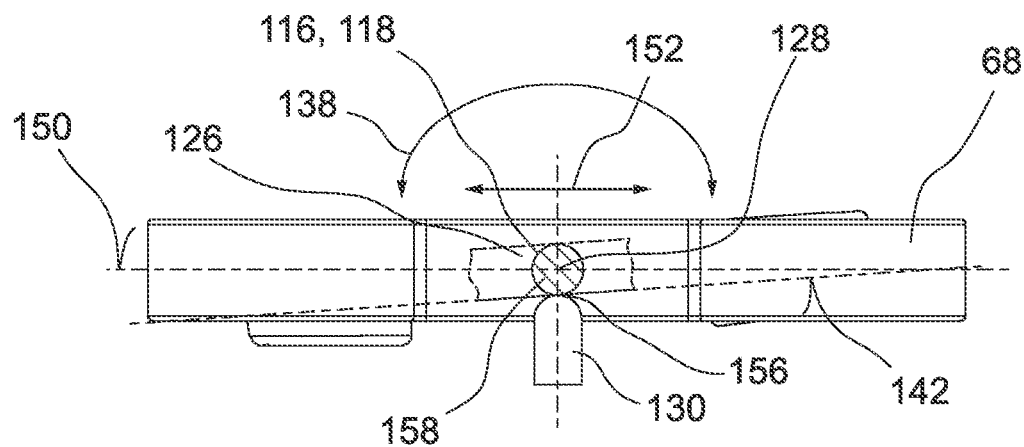
FIG. 10 is a simplified side view of an embodiment of a valve member that is modified in comparison to the illustration in FIG. 9.
Figure 11:
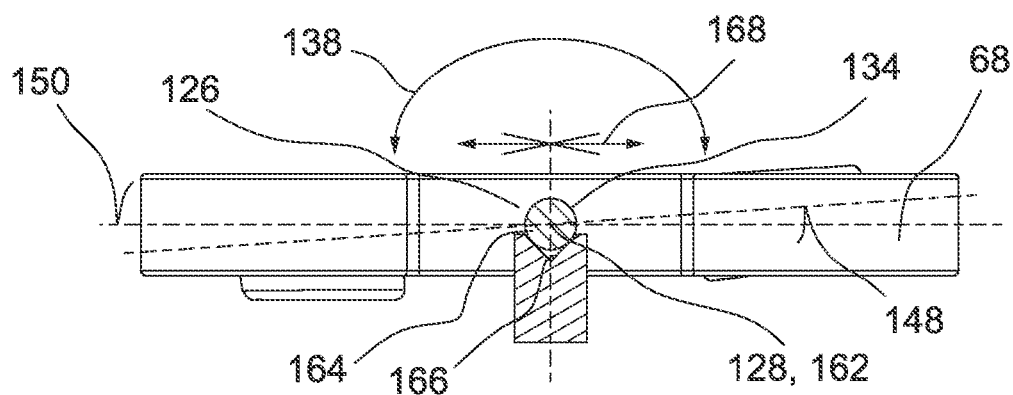
FIG. 11 is a simplified side view of a further embodiment of a valve member that is modified in comparison to the illustration in FIG. 9.

To reduce the tendency to leakage and leaks, it is conceivable to make the design of the connecting webs 116, 118 more favorable, and/or to shift the shift pivot axis 140 towards a central longitudinal axis through the connecting webs 116, 118, so that these axes coincide as much as possible. FIGS. 10 and 11 illustrate exemplary configurations that take these aspects into account. To complete the exemplary embodiments schematically illustrated there, reference is made to FIGS. 1 to 9.

FIG. 10 illustrates an arrangement, in which the connecting webs 116, 118 have a round cross-section 158. Nevertheless, in this arrangement, there is still an offset between a central axis 128 through the connecting webs 116, 118 and the (current) pivot axis 156, since the contact surface 142 of the frame 74 of the framework 56 still rolls over the bearing piece 130. Thus, there are still parasitic movements 152 between the connecting webs 116, 118 and the passage area 126 of the seal 68 surrounding them. However, since the cross-section 158 is now round and/or circular, there are more favorable contact conditions between the connecting web 116, 118 and the passage area 126 of the seal 68, compared to the angular configuration of the cross section 126 shown in FIG. 9. In this way, the tendency towards leakage can be reduced, especially with high dynamics.

FIG. 11 illustrates a further modified embodiment, in which the connecting webs 116, 118 further comprise a round cross section 164. The central axis 128 of the connecting web 116, 118 coincides with the pivot axis 162 in the embodiment shown in FIG. 11. This is made possible by a bearing seat 166, which can accommodate and store the round cross-section 164 in such a way that the connecting web 116, 118 can be pivoted about its center. The section of the connecting web 116, 118 arranged on the bearing seat 166 can also be referred to as a bearing section 134. Any parasitic movements (parasitic transverse movements, compare reference numeral 168) between the connecting webs 116, 118 and the passage area 126 of the seal 68 surrounding them are thus reduced or even completely avoided.

When the connecting webs 116, 118, which are provided with a round cross section 164, rotate slightly about their central axis 128 in the passage area 126, there are only slight relative movements with respect to the seal 68. In this way, good sealing of the connecting webs 116, 118 can be ensured. Thus, the valve is also suitable for high pressure applications with a high switching frequency/dynamic. The improved sealing is brought about on the one hand by the round cross section 164 and on the other hand by the coincidence of the central axis 128 with the pivot axis 162. Both measures in themselves can lead to improvement sealing. In combination, the sealing effect and suitability for high-pressure applications are further increased.

In the following, with reference to FIGS. 12 to 20, further configurations of valve members are illustrated, which make use of the principles shown in FIGS. 10 and 11 to optimize the sealing effect.

Figure 12:
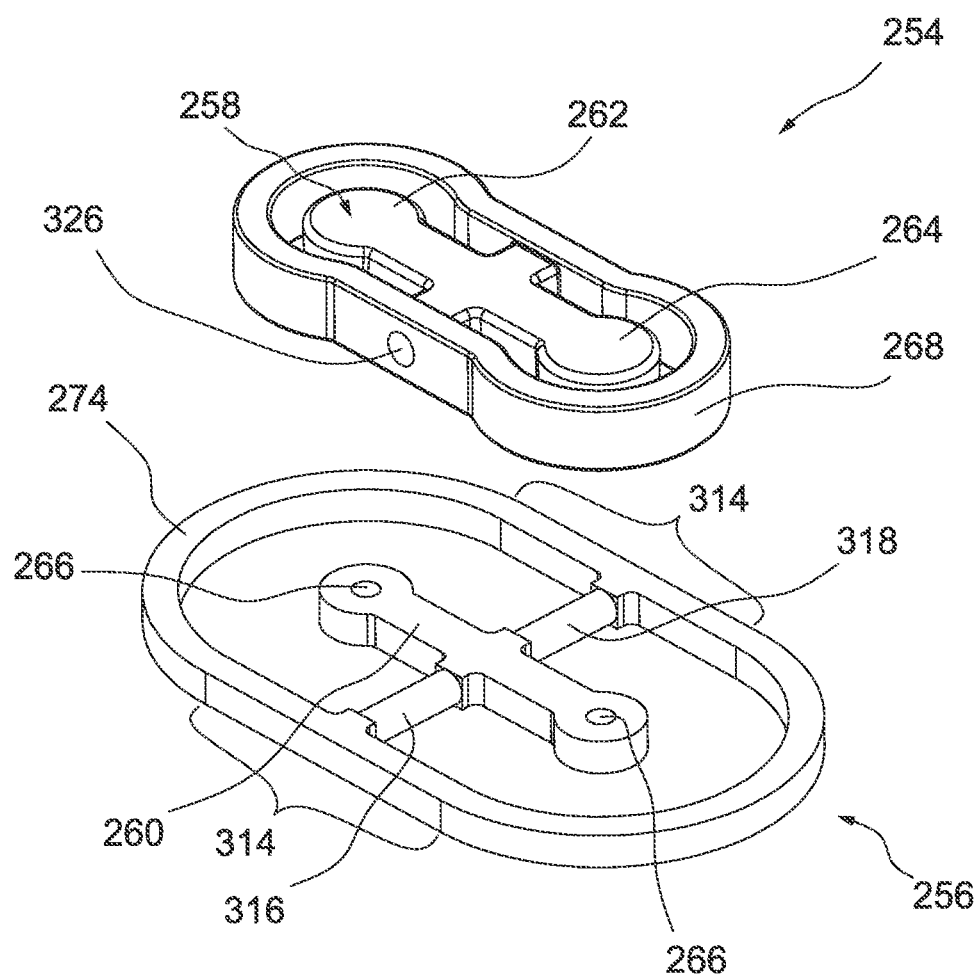
FIG. 12 is a perspective exploded view of a further embodiment of a valve member.
Figure 13:
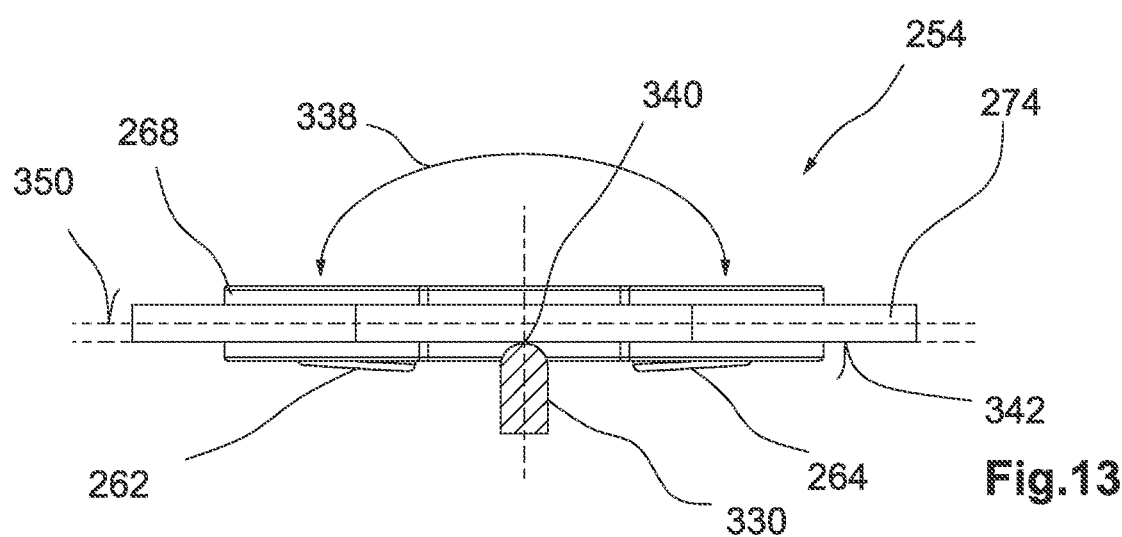
FIG. 13 is a simplified side view of the valve member according to FIG. 12.

FIGS. 12 and 13 illustrate a valve member 254, which comprises a framework 256 and a closing body 258. The closing body 258 is supported on a support bar 260 of the framework 256. A first sealing section 262 and a second sealing section 264 are formed on the closing body 258. FIG. 12 further illustrates an exemplary embodiment, in which the support bar 260 is provided with a recess 266 in each of its end regions. The recesses 266 can contribute to a better connection between the closing body 258 and the framework 256, for instance the support bar 260. In case the closing body 258 is manufactured in such a way that the framework 256 functions as an insert, the material for the closing body 258 can penetrate into the recesses 266. Hence, a form-fitting and/or material-locking position securing can result there. In certain embodiments, the recesses 266 are arranged in those regions of the support bar 260, in which the sealing sections 262, 264 of the closing body 258 are provided.

It is understood that the recesses 266 are not only conceivable in the exemplary embodiment according to FIGS. 12 and 13. Such recesses in the support bar for the closing body may also be used in other embodiments, which are mentioned exemplarily in the context of the present disclosure. The recesses may be arranged as through holes and/or depressions in the respective support bar. The recesses can be produced in the support bar, for example, by a suitable separation process/material-removing process Furthermore, the valve member 254 according to FIGS. 12 and 13 has a seal 268, which, in exemplary embodiments, is manufactured as a part of or integral with the closing body 258. The seal 268 is arranged in the operable state between a surrounding frame 274 of the frame 256 and the support bar 260. The closing body 258 is provided with the two sealing sections 262, 264 in the region of the support bar 260. Connecting webs 316, 318 extend between the frame 274 and/or an actuation section 314 of the valve member 254 and the support bar 260. The connecting webs 316, 318 are provided with round cross-sections, at least in a passage area 326 through the seal 268, to bring about favorable contact conditions between the connecting webs 316, 318 and the passage area 326 of the seal 268.

FIG. 13 illustrates that there is still an offset between the (instantaneous) pivot axis 340 and the central plane 350. With the pivoting movement (arrow 338), this leads to the support surface 342 rolling off on the bearing piece 330. Nevertheless, the rounded/cylindrical design of the connecting webs 316, 318 (FIG. 12) increases the sealing effect of the seal 268.

A further exemplary embodiment of a valve member 354 is illustrated with reference to FIGS. 14 and 15. The valve member 354 is arranged to be at least similar to the valve member 254 according to FIGS. 12 and 13. The valve member 354 comprises a framework 356 and a sealing body 358. Sealing sections 362, 364 are formed at the sealing body 358. The sealing body 358 is supported on a support bar 360 in the center of the framework 356. The sealing body 358 is also assigned with a seal 368. The seal 368 may be formed as part of the sealing body 358. The framework 356 further comprises a surrounding frame 374, in which an actuation section 414 for actuating the valve member 354 is formed. Connecting webs 416, 418 extend between the frame 374 and the support bar 360. The connecting webs 416, 418 are at least sectionally provided with a round/circular cross-section. In certain embodiments, this applies to an area of the connecting webs 416, 418, in which they protrude through a passage area 426 through the seal 368.

Figure 14:
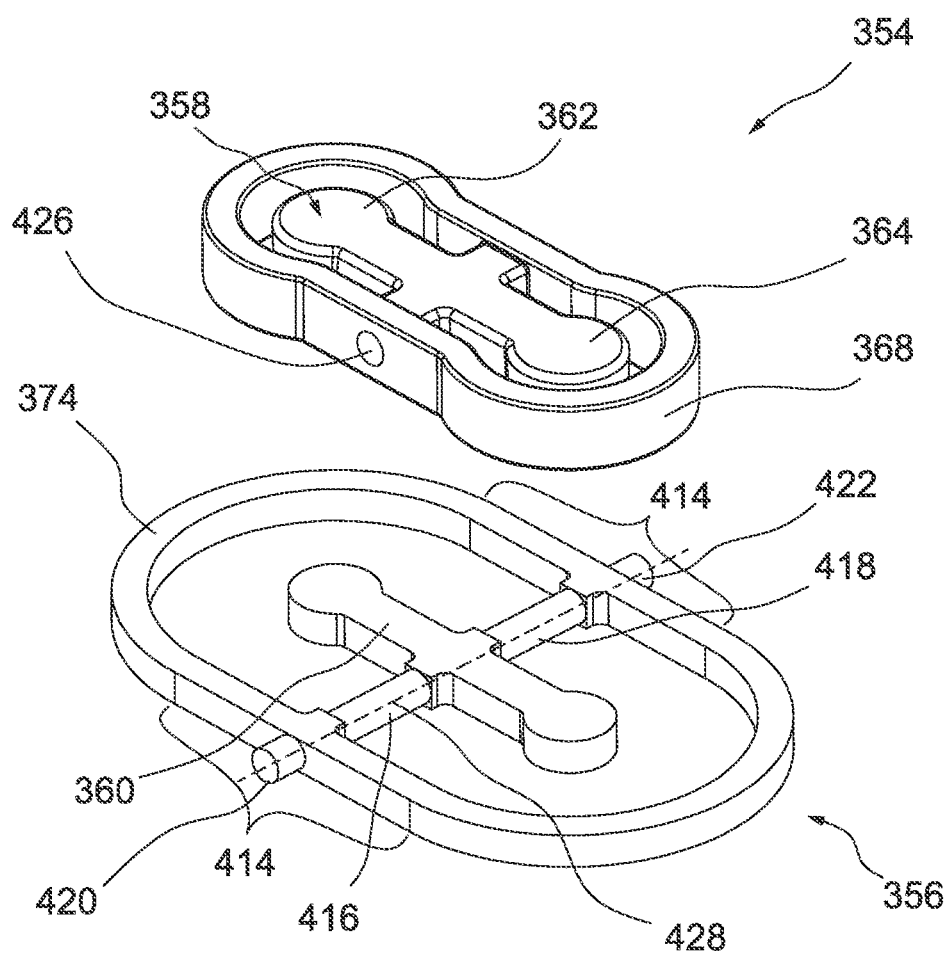
FIG. 14 is a perspective exploded view of a further embodiment of a valve member.

In FIG. 14 there are further shown protrusions and/or extensions 420, 422, which are designed concentrically to the connecting webs 416, 418 and/or as an extension of the connecting webs 416, 418. A central axis through the connecting webs 416, 418 is denoted by 428 in FIGS. 14 and 15. The extensions 420, 422 in FIG. 14 and FIG. 15 are concentric with respect to the central axis 428. The extensions 420, 422 extend outside the frame 374 as extensions of the connecting webs 416, 418. The extensions 420, 422 can be used as bearing pins.

Figure 15:
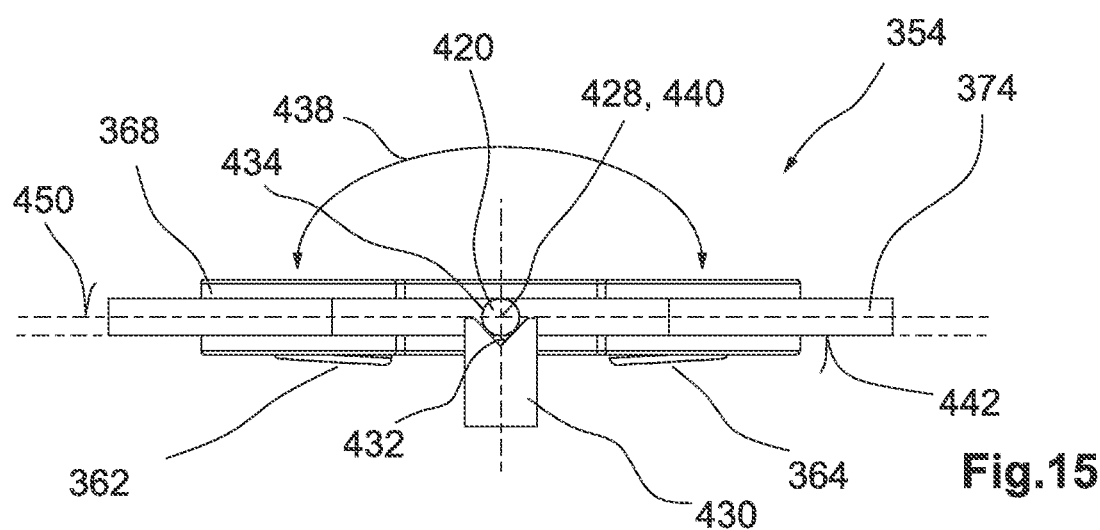
FIG. 15 is a simplified side view of the valve member according to FIG. 14.

FIG. 15 additionally illustrates that the projections 420, 422, which are arranged as bearing pins, are assigned on the housing side with a bearing piece 430 having a bearing seat 432. In this exemplary embodiment, the bearing seat 432 is configured in such a way that the framework 356 is pivoted about the central axis 428 when the valve member 354 is actuated, so that a resulting pivot axis 440 coincides with the central axis 428. A bearing section 434, which is formed by the extensions 420, 422 in this embodiment, is arranged on the bearing seat 432. The pivoting movement is illustrated by a curved double arrow indicated by 438. As a result, the surface 442 of the frame 374 is no longer used to rest on the housing, but the pin-like projections 420, 422, which define the pivot axis 440, which is arranged in the vicinity of the central plane 450 or even in the central plane 450 through the connecting webs 416, 418.

It is understood that other designs of the bearing seat 432 for receiving and supporting the extensions 420, 422 are also conceivable. In certain embodiments, this can relate to the shape of the bearing seat of the bearing seat 432. In principle, it is also conceivable to arrange the bearing section 434 not outside but inside the frame 474. Accordingly, the bearing sections 434 and their coupling to the bearing piece 430 on the housing side would move closer to the passage area 426.

Another exemplary embodiment of a valve member 454 is illustrated with reference FIGS. 16 and 17. The valve member 454 is arranged to be at least similar to the valve member 254 according to FIGS. 12 and 13 or the valve member 354 according to FIGS. 14 and 15. The valve member 454 has a framework 456 and a sealing body 458. Sealing sections 462, 464 are formed on the sealing body 458. The sealing body 458 is supported on a support bar 460 in the center of the framework 456. A seal 468 is also assigned to the sealing body 458. The seal 468 can be formed as part of the sealing body 458. The framework 456 further comprises a surrounding frame 474, in which an actuation section 514 for actuating the valve member 454 is formed. Connecting webs 516, 518 extend between the frame 474 and the support bar 460. The connecting webs 516, 518 have, at least sectionally, a round/circular cross section. In certain embodiments, this applies to a section of the connecting webs 516, 518, in which they extend through a passage area 526 through the seal 468.

Figure 16:
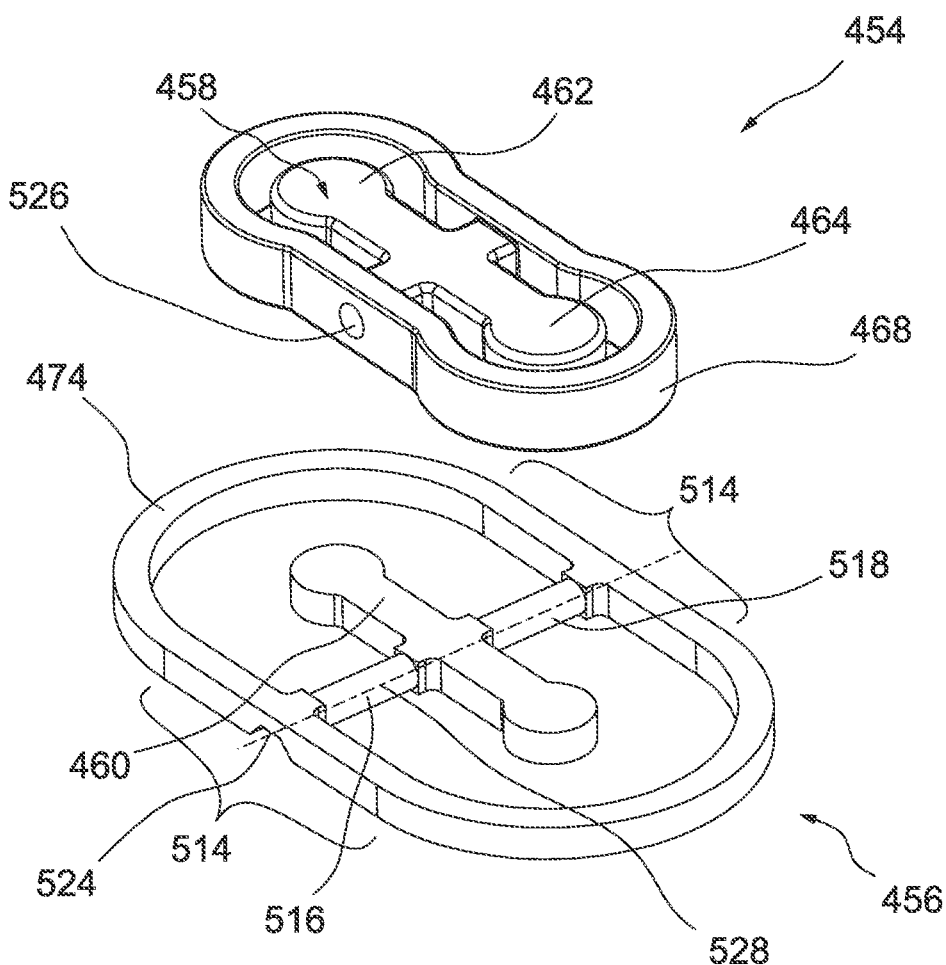
FIG. 16 is a perspective exploded view of a further embodiment of a valve member.
Figure 17:
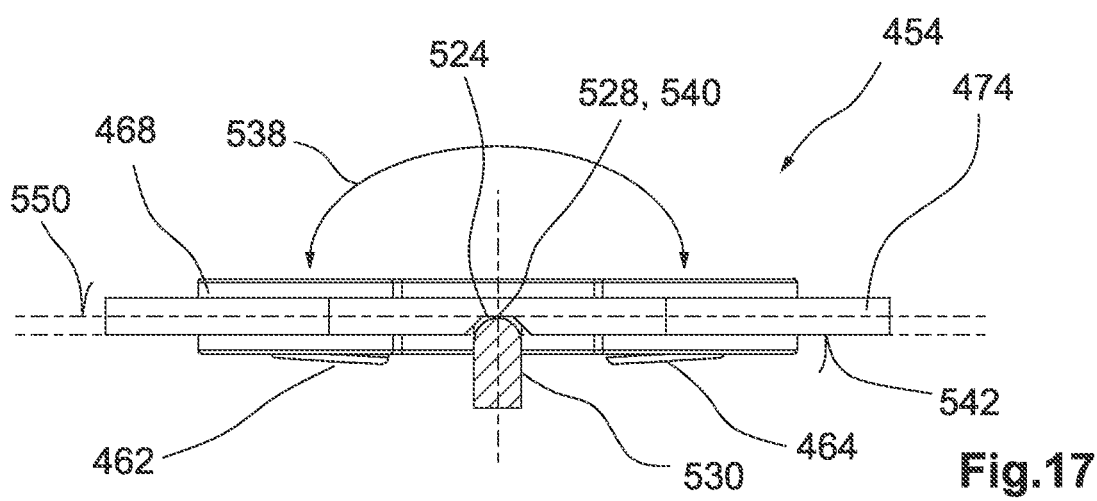
FIG. 17 is a simplified side view of the valve member according to FIG. 16.

In FIGS. 16 and 17, at least one notch and/or recess 524 is further provided in the actuation section 514 or on the frame 474, compare also the side view in FIG. 17. The recess 524 ensures the desired displacement of the pivot axis 540 towards the central plane 550 and/or a central axis 528 through the connecting webs 516, 518. According to the embodiment illustrated in FIGS. 16 and 17, a bearing piece 530 is provided on the housing and is contacted by the valve member 454 in the region of the recess 524. The pivoting movement is illustrated by a curved double arrow designated by 538. This means that the surface 542 of the frame 474 is no longer used to rest on the housing, but rather the recesses 524 in the frame 474, which define the pivot axis 540, which is arranged close to the central plane 550 or even in the central plane 550 and/or concentric to the central axis 528 through the connecting webs 516, 518.

The notch or recess 524 can be made in the actuation section 514 and/or the frame 474 by a suitable material-removing process and/or a forming process. It is understood that other configurations of the bearing piece 530 and the recess 524 are also conceivable. In FIGS. 16 and 17, material is removed from the frame 474 in the actuation section 514 to form the recess 524.

With reference to FIGS. 18 and 19, a further alternative embodiment of a valve member 554 is illustrated. The valve member 554 comprises a framework 556 and a closing body 558. Sealing sections 562, 564 are formed on the closing body 558. The framework 556 comprises a surrounding frame 574 and, within the frame 574, a support bar 560. The frame 574 and the support bar 560 are connected to one another via connecting webs 616, 618. Actuation sections 614, via which the valve member 554 can be actuated, are formed on the frame 574. In the assembled state of the closing body 558, the connecting webs 516, 518 extend through a passage area 626 of the closing body 558.

In the exemplary embodiment shown in FIGS. 18 and 19, the connecting webs 616, 618 comprise a quadrangular cross section, compare also the illustration of the passage area 626 in FIG. 18. A recess 624 formed as a notch is formed on the framework 574 of the frame 556. In the exemplary embodiment illustrated with reference to FIGS. 18 and 19, the recess 624 is formed by sectionally deforming/stamping the frame 574 in the region of the actuation sections 614. The recess 624 defines a bearing area in which the valve member 554 and/or its framework 556 interacts with a housing support/bearing piece assigned thereto (not shown in FIGS. 18 and 19).

The configuration of the recess 624 enables a rocking movement and/or tilting of the frame 574 with respect to the housing, to switch over the valve member 554, compare the curved double arrow 638 in FIG. 19. Depending on how the counter-contour is formed, a resulting pivot axis 640 is brought about, with is disposed towards a central plane 650 through the connecting webs 616, 618, at least in the passage area 626. FIG. 19 further illustrates that the (lower) surface 642 of the frame 574 is no longer used to rest on the housing, but rather the recesses 624 in the frame 574, which define the pivot axis 640 (together with the associated housing-side bearing piece).

FIG. 20 illustrates an embodiment of a valve member 654 that is very similar to the valve member 554 according to FIG. 19. The valve member 654 comprises a framework 656 and a closing body 658. Sealing sections 662, 664 are formed on the closing body 658. The framework 656 comprises a support bar (hidden in FIG. 20) for the closing body 658. The framework 656 further includes a frame 674 that surrounds the support bar. A surrounding seal 668 is arranged between the support bar and the frame 674 and is assigned to or connected to the closing body 658.

Connecting webs 716, 718 extend between the support bar and the frame 674 and pass through the seal 668 in a passage area 726. In alignment with the connecting webs 716, 718, a recess 724 is arranged on the frame 674 in the actuation section 714. In other words, the frame 674 is partially cranked in the area of the actuation section 714 to form the recess 724. In a further exemplary embodiment, also the connecting webs 716, 718 are slightly cranked towards the frame 674 to form the recess 724. FIG. 20 further illustrates that the resulting pivot axis 740 is no longer defined via the (lower) surface 742 but rather via the recess 724 which is offset therefrom. The recess 724 is designed in such a way that, in connection with the housing-side bearing piece (not shown in FIG. 20), a pivot axis 740 is formed, which is displaced towards the central plane 750. In this way, when the valve member 654 moves in the passage area 724 of the seal 658, fewer parasitic relative movements occur, this might result in leakage.

The invention claimed is:

1. A device to regulate the flow of a fluid, comprising:
a valve housing having at least two valve ports, wherein in the valve housing at least one fluid path is formed, which extends between the at least two valve ports,
at least one valve seat, which is assigned to the at least one fluid path,
a valve member having a closing body, which is configured to be coupled to the at least one valve seat to block or release the at least one fluid path, and an actuation section, which is connected via at least one connecting web with the closing body to move the closing body,
an actuating unit that actuates the valve member,
wherein a surrounding seal extends between the closing body and the actuation section, which separates the closing body and the actuation section from one another,
wherein the at least one connecting web is configured such that the closing body is pivoted upon actuation of the actuation section by the actuating unit to move the valve member and thus the closing body relative to the at least one valve seat,
wherein the at least one connecting web extends through a passage area of the seal; and
wherein the valve member is arranged to minimize deformations in the passage area as the closing body is moved,
wherein the valve member is pivotable about a pivot axis upon the actuation by the actuating unit,
wherein the seal defines a central plane,
wherein the pivot axis is offset from a surface of the valve member, which faces away from the actuating unit, towards the central plane, and
wherein at least one of the actuation section and the at least one connecting web are provided with a notch that forms the offset of the pivot axis.

2. The device of claim 1,
wherein the at least one connecting web comprises a round cross-section, at least in the passage area.

3. The device of claim 1,
wherein the actuation section is part of an actuating frame that surrounds the closing body, and wherein two opposing connecting webs are provided, which extend between the actuating frame and the closing body.

4. The device of claim 1,
wherein the valve member comprises a support bar that supports the closing body, and
wherein the support bar, the at least one connecting web and the actuation section are firmly connected to one another or part of a one-piece framework.

5. The device of claim 4,
wherein the actuation section is part of an actuating frame that surrounds the closing body.

6. The device of claim 1,
wherein the valve housing comprises three valve ports,
wherein two fluid paths are formed in the valve housing, which extend between the three valve ports,
wherein the device further comprises two valve seats, each of which being assigned to one of the two fluid paths,
wherein the closing body comprises two sealing sections, each of which being respectively assigned to one of the two valve seats, and
wherein the valve member is pivotable to release or block one of the two valve seats.

7. A device to regulate the flow of a fluid, comprising:
a valve housing, having at least two valve ports, wherein in the valve housing at least one fluid path is formed, which extends between the at least two valve ports,
at least one valve seat, which is assigned to the at least one fluid path,
a valve member having a closing body, which is configured to be coupled to the at least one valve seat to block or release the at least one fluid path, and an actuation section, which is connecting via at least one connecting web with the closing body to move the closing body,
an actuating unit that actuates the valve member,
wherein a surrounding seal extends between the closing body and the actuation section, which separates the closing body and the actuation section from one another,
wherein the at least one connecting web is configured such that the closing body is pivoted upon actuation of the actuation section by the actuating unit to move the valve member and thus the closing body relative to the at least one valve seat,
wherein the at least one connecting web extends through a passage area of the seal; and
wherein the valve member is arranged to minimize deformations in the passage area as the closing body is moved,
wherein the valve member is pivotable about a pivot axis upon the actuation by the actuating unit,
wherein the seal defines a central plane,
wherein the pivot axis is offset from a surface of the valve member, which faces away from the actuating unit, towards the central plane,
wherein one of the actuation section and the at least one connecting web is provided with a cranking, and the other one of the actuation section and the at least one connecting web is provided with a notch, and
wherein the cranking and the notch cooperate to form the offset of the pivot axis.

8. The device of claim 7,
wherein the at least one connecting web comprises a round cross-section, at least in the passage area.

9. The device of claim 7,
wherein the actuation section is part of an actuating frame that surrounds the closing body, and
wherein two opposing connecting webs are provided, which extend between the actuating frame and the closing body.

10. The device of claim 7,
wherein the valve member comprises a support bar that supports the closing body, and
wherein the support bar, the at least one connecting web and the actuation section are firmly connected to one another or part of a one-piece framework.

11. The device of claim 10, wherein the actuation section is part of an actuating frame that surrounds the closing body.

12. The device of claim 7,
wherein the valve housing comprises three valve ports,
wherein two fluid paths are formed in the valve housing, which extend between the three valve ports,
wherein the device further comprises two valve seats, each of which being assigned to one of the two fluid paths,
wherein the closing body comprises two sealing sections, each of which being respectively assigned to one of the two valve seats, and
wherein the valve member is pivotable to release or block one of the two valve seats.

13. A device to regulate the flow of a fluid, comprising:
a valve housing having at least two valve ports, wherein in the valve housing at least one fluid path is formed, which extends between the at least two valve ports,
at least one valve seat, which is assigned to the at least one fluid path,
a valve member having a closing body, which is configured to be coupled to the at least one valve seat to block or release the at least one fluid path, and an actuation section, which is connected via at least one connecting web with the closing body to move the closing body,
an actuating unit that actuates the valve member,
wherein a surrounding seal extends between the closing body and the actuation section, which separates the closing body and the actuation section from one another,
wherein the at least one connecting web is configured such that the closing body is pivoted upon actuation of the actuation section by the actuating unit to move the valve member and thus the closing body relative to the at least one valve seat,
wherein the at least one connecting web extends through a passage area of the seal; and
wherein the valve member is arranged to minimize deformations in the passage area as the closing body is moved,
wherein the valve member is pivotable about a pivot axis that is defined by the at least one connecting web and a corresponding bearing piece on the valve housing,
wherein on a side of the actuation section that faces away from the closing body, an extension of the at least one connecting web is formed, and
wherein the extension is provided with a round cross-section, and supported and guided on the bearing piece on the valve housing.

14. The device of claim 13, wherein the at least one connecting web comprises a round cross-section, at least in the passage area.

15. The device of claim 13,
wherein the actuation section is part of an actuating frame that surrounds the closing body, and wherein two opposing connecting webs are provided, which extend between the actuating frame and the closing body.

16. The device of claim 13,
wherein the valve member comprises a support bar that supports the closing body, and
wherein the support bar, the at least one connecting web and the actuation section are firmly connected to one another or part of a one-piece framework.

17. The device of claim 16, wherein the actuation section is part of an actuating frame that surrounds the closing body.

18. The device of claim 13,
wherein the valve housing comprises three valve ports,
wherein two fluid paths are formed in the valve housing, which extend between the three valve ports,
wherein the device further comprises two valve seats, each of which being assigned to one of the two fluid paths,
wherein the closing body comprises two sealing sections, each of which being respectively assigned to one of the two valve seats, and
wherein the valve member is pivotable to release or block one of the two valve seats.

19. A device for regulating the flow of a fluid, comprising
a valve housing having three valve ports, wherein in the valve housing two fluid paths are formed, which extend between the three valve ports,
two valve seats, each being assigned to one of the two fluid paths,
a valve member having a closing body, which is configured to be coupled to the two valve seats to block or release the two fluid paths, and an actuation section, which is connected via at least one connecting web with the closing body to move the closing body,
an actuating unit that actuates the valve member,
wherein a surrounding seal extends between the closing body and the actuation section, which separates the closing body and the actuation section from one another,
wherein the at least one connecting web is configured such that the closing body is pivoted upon actuation of the actuation section by the actuating unit about a pivot axis to move the valve member and thus the closing body relative to the two valve seats,
wherein the at least one connecting web extends through a passage area of the seal; and
wherein a recess is formed in the actuation section that shifts the pivot axis of the valve member towards a central plane through the seal.

20. A device for regulating the flow of a fluid, comprising
a valve housing having three valve ports, wherein in the valve housing two fluid paths are formed, which extend between the three valve ports,
two valve seats, each being assigned to one of the two fluid paths,
a valve member having a closing body, which is configured to be coupled to the two vale seats to block or release the two fluid paths, and an actuation section, which is connected via at least one connecting web with the closing body to move the closing body,
an actuating unit that actuates the valve member,
wherein a surrounding seal extends between the closing body and the actuation section, which separates the closing body and the actuation section from one another,
wherein the at least one connecting web is configured such that the closing body is pivoted upon actuation of the actuation section by the actuating unit about a pivot axis to move the valve member and thus the closing body relative to the two valve seats,
wherein the at least one connecting web extends through a passage area of the seal; and
wherein an outer extension of the at least one connecting web is provided that extends beyond the actuation section, the extension having a round cross-section and being pivotably supported on a bearing seat at the valve housing.

* * * * *